United States Patent
Sell et al.

(10) Patent No.: US 7,232,869 B2
(45) Date of Patent: Jun. 19, 2007

(54) CATALYST COMPOSITION FOR OLEFIN POLYMERIZATION

(75) Inventors: Thorsten Sell, Frankfurt (DE); Joerg Schottek, Frankfurt (DE); Nicola Stefanie Paczkowski, Loveland, OH (US); Andreas Winter, Neuleiningen (DE)

(73) Assignee: Novolen Technology Holdings, C.V., The Hague (NL)

( * ) Notice: Subject to any disclaimer, the term of this patent is extended or adjusted under 35 U.S.C. 154(b) by 46 days.

(21) Appl. No.: 11/130,925

(22) Filed: May 17, 2005

(65) Prior Publication Data

US 2006/0264587 A1    Nov. 23, 2006

(51) Int. Cl.
  C08F 4/02      (2006.01)
  C08F 4/64      (2006.01)
  C08F 4/6392    (2006.01)

(52) U.S. Cl. ............ 526/133; 502/103; 502/104; 502/114; 502/117; 502/120; 502/128; 502/152; 526/129; 526/132; 526/135; 526/153; 526/160

(58) Field of Classification Search ............ 502/103, 502/104, 114, 117, 120, 128, 155, 152; 526/133, 526/134, 129, 135, 153, 160, 132
See application file for complete search history.

(56) References Cited

U.S. PATENT DOCUMENTS

| | | |
|---|---|---|
| 4,530,914 A | 7/1985 | Ewen et al. |
| 4,542,199 A | 9/1985 | Kaminsky et al. |
| 4,752,597 A | 6/1988 | Turner |
| 4,808,561 A | 2/1989 | Welborn, Jr. |
| 4,871,705 A | 10/1989 | Hoel |
| 4,931,417 A | 6/1990 | Miya et al. |
| 4,933,403 A | 6/1990 | Kaminsky et al. |
| 4,937,299 A | 6/1990 | Ewen et al. |
| 5,017,714 A | 5/1991 | Welborn, Jr. |
| 5,026,798 A | 6/1991 | Canich |
| 5,057,475 A | 10/1991 | Canich et al. |
| 5,120,867 A | 6/1992 | Welborn, Jr. |
| 5,132,381 A | 7/1992 | Winter et al. |
| 5,145,819 A | 9/1992 | Winter et al. |
| 5,198,401 A | 3/1993 | Turner et al. |
| 5,239,022 A | 8/1993 | Winter et al. |
| 5,243,001 A | 9/1993 | Winter et al. |
| 5,276,208 A | 1/1994 | Winter et al. |
| 5,278,119 A | 1/1994 | Turner et al. |
| 5,296,434 A | 3/1994 | Karl et al. |
| 5,304,614 A | 4/1994 | Winter et al. |
| 5,324,800 A | 6/1994 | Welborn, Jr. et al. |
| 5,328,969 A | 7/1994 | Winter et al. |
| 5,329,033 A | 7/1994 | Spaleck et al. |
| 5,350,723 A | 9/1994 | Neithamer et al. |
| 5,374,752 A | 12/1994 | Winter et al. |
| 5,391,790 A | 2/1995 | Rohrmann et al. |
| 5,416,178 A | 5/1995 | Winter et al. |
| 5,436,305 A | 7/1995 | Alt et al. |
| 5,455,366 A | 10/1995 | Rohrmann et al. |
| 5,510,502 A | 4/1996 | Sugano et al. |
| 5,532,396 A | 7/1996 | Winter et al. |
| 5,543,373 A | 8/1996 | Winter et al. |
| 5,554,704 A | 9/1996 | Burkhardt et al. |
| 5,576,260 A | 11/1996 | Winter et al. |
| 5,612,428 A | 3/1997 | Winter et al. |
| 5,616,663 A | 4/1997 | Imuta et al. |
| 5,616,747 A | 4/1997 | Rohrmann et al. |
| 5,629,254 A | 5/1997 | Fukuoka et al. |
| 5,635,437 A | 6/1997 | Burkhardt et al. |
| 5,661,096 A | 8/1997 | Winter et al. |
| 5,672,668 A | 9/1997 | Winter et al. |
| 5,679,812 A | 10/1997 | Winter et al. |
| 5,723,640 A | 3/1998 | Bukuoka et al. |
| 5,739,366 A | 4/1998 | Imuta et al. |
| 5,741,868 A | 4/1998 | Winter et al. |
| 5,770,753 A | 6/1998 | Küber et al. |
| 5,786,432 A | 7/1998 | Küber et al. |
| 5,830,821 A | 11/1998 | Rohrmann et al. |
| 5,840,644 A | 11/1998 | Küber et al. |
| 5,840,948 A | 11/1998 | Rohrmann et al. |
| 5,852,142 A | 12/1998 | Rohrmann et al. |
| 5,929,264 A | 7/1999 | Rohrmann et al. |
| 5,932,669 A | 8/1999 | Rohrmann et al. |
| 6,017,841 A | 1/2000 | Winter et al. |
| 6,051,522 A | 4/2000 | Rohrmann et al. |
| 6,051,727 A | 4/2000 | Küber et al. |
| 6,057,408 A | 5/2000 | Winter et al. |
| 6,087,291 A | 7/2000 | Speca et al. |
| 6,100,214 A | 8/2000 | Walzer, Jr. et al. |
| 6,114,479 A | 9/2000 | Speca et al. |
| 6,117,955 A | 9/2000 | Agapiou et al. |
| 6,124,230 A | 9/2000 | Speca et al. |
| 6,140,432 A | 10/2000 | Agapiou et al. |
| 6,194,341 B1 | 2/2001 | Canich et al. |

(Continued)

FOREIGN PATENT DOCUMENTS

EP        0 302 424        7/1991

(Continued)

*Primary Examiner*—Caixia Lu
(74) *Attorney, Agent, or Firm*—Dilworth & Barrese, LLP

(57) ABSTRACT

A process for the preparation of a catalyst system includes the steps of combining a Lewis base, an organic compound having at least one functional group containing active hydrogen, and an organometallic component with a particulate support material to provide an intermediate composition, and then combining the intermediate composition with one or more metallocene compound. The catalyst system is advantageously used for olefin polymerization.

45 Claims, No Drawings

U.S. PATENT DOCUMENTS

| | | |
|---|---|---|
| 6,218,558 B1 | 4/2001 | Kato et al. |
| 6,228,795 B1 | 5/2001 | Vizzini |
| 6,242,544 B1 | 6/2001 | Küber et al. |
| 6,245,706 B1 | 6/2001 | Hlatky |
| 6,252,097 B1 | 6/2001 | Sugano et al. |
| 6,255,506 B1 | 7/2001 | Küber et al. |
| 6,255,515 B1 | 7/2001 | Kato et al. |
| 6,376,407 B1 | 4/2002 | Burkhardt et al. |
| 6,376,408 B1 | 4/2002 | Burkhardt et al. |
| 6,376,409 B1 | 4/2002 | Burkhardt et al. |
| 6,376,410 B1 | 4/2002 | Burkhardt et al. |
| 6,376,411 B1 | 4/2002 | Burkhardt et al. |
| 6,376,412 B1 | 4/2002 | Burkhardt et al. |
| 6,376,413 B1 | 4/2002 | Kuchta et al. |
| 6,376,627 B1 | 4/2002 | Burkhardt et al. |
| 6,380,120 B1 | 4/2002 | Burkhardt et al. |
| 6,380,121 B1 | 4/2002 | Kuchta et al. |
| 6,380,122 B1 | 4/2002 | Kuchta et al. |
| 6,380,123 B1 | 4/2002 | Kuchta et al. |
| 6,380,124 B1 | 4/2002 | Burkhardt et al. |
| 6,380,330 B1 | 4/2002 | Burkhardt et al. |
| 6,380,331 B1 | 4/2002 | Kuchta et al. |
| 6,380,334 B1 | 4/2002 | Kuchta et al. |
| 6,399,723 B1 | 6/2002 | Burkhardt et al. |
| 6,444,606 B1 | 9/2002 | Bingel et al. |
| 6,469,114 B1 | 10/2002 | Schottek et al. |
| 6,482,902 B1 * | 11/2002 | Bohnen et al. ............ 526/127 |
| 6,953,829 B2 * | 10/2005 | Kratzer et al. ............ 526/160 |
| 2001/0021755 A1 | 9/2001 | Kuber et al. |
| 2003/0149199 A1 | 8/2003 | Schottek et al. |
| 2005/0192178 A1 | 9/2005 | Takaoki |
| 2005/0245701 A1 | 11/2005 | Oshima et al. |
| 2005/0272596 A1 * | 12/2005 | Kratzer et al. ............ 502/118 |
| 2006/0166813 A1 * | 7/2006 | Kratzer ............ 502/103 |

FOREIGN PATENT DOCUMENTS

| | | |
|---|---|---|
| EP | 0 284 708 | 1/1996 |
| EP | 0 320 762 | 3/1996 |
| EP | 0 416 815 | 8/1997 |
| EP | 0 576 970 | 1/1998 |
| EP | 0 611 773 | 4/1998 |
| EP | 0 669 340 | 11/2001 |
| EP | 0 129 368 | 4/2002 |
| EP | 1300425 A | 4/2003 |
| EP | 0 537 686 | 1/2005 |
| WO | WO 94/14856 | 7/1994 |
| WO | WO 94/28034 | 12/1994 |
| WO | WO 96/04319 | 2/1996 |
| WO | WO 96/23005 | 8/1996 |
| WO | WO 97/32906 | 9/1997 |
| WO | WO 98/01481 | 1/1998 |
| WO | WO 98/22486 | 5/1998 |
| WO | WO 99/33881 | 7/1999 |
| WO | WO 99/40129 | 8/1999 |
| WO | WO 00/05277 | 2/2000 |
| WO | WO 00/12565 | 3/2000 |
| WO | WO 00/62928 | 10/2000 |
| WO | WO 01/47635 | 7/2001 |
| WO | WO 01/48034 | 7/2001 |
| WO | WO 03/045964 | 6/2003 |
| WO | WO 03/106470 | 12/2003 |
| WO | WO 2004/007569 | 1/2004 |
| WO | WO 2004/007570 | 1/2004 |

* cited by examiner

CATALYST COMPOSITION FOR OLEFIN POLYMERIZATION

BACKGROUND

1. Field of the Invention

The present invention relates to a process for preparing a catalyst system for olefin polymerization which is obtainable by bringing at least one metallocene, at least one organometallic compound, at least one compound that is obtainable by a reaction of an organometallic compound with an organic compound bearing a functional group containing active hydrogen, at least one Lewis base and at least one support into contact with one another, to catalyst systems obtainable by this process, to the use of these catalyst systems for olefin polymerizations, to a process using such catalyst systems for polymerization and copolymerisation of olefins and to polymers which are prepared using such catalyst systems.

2. Background of the Art

Processes for preparing polyolefins using soluble, homogeneous catalyst systems comprising organic transition metal compounds such as metallocene complexes are well known (Angew. Chem. 1995, 107, 1255-1283 or U.S. Pat. Nos. 4,752,597; 5,017,714; 5,391,790; 5,616,747 or EP Patent Nos. 0 320 762; 0 416 815; 0 537 686 and 0 669 340). They may be produced, for example, by reacting cyclopentadienyl metal compounds with halides of transition metals, such as titanium, zirconium, and hafnium.

It is also well known that basic properties of the metallocenes, such as polymerization activity, stereoselectivity, regioselectivity, and maximum achievable polymer molecular weight can be systematically controlled by specific substitution patterns of the ligand sphere. However, to use metallocenes for the stereoselective and regioselective polymerization of olefins, the preparation of the isomerically pure racemic form is absolutely necessary, since the corresponding meso form produces undesired atactic polymer, like atactic polypropylene. The isomerically pure racemic form is understood to mean a rac:meso ratio of at least 5, and preferably 10.

Such stereoselective and/or regioselective metallocenes for the polymerization of olefins to polyolefins especially for the polymerization of propylene or the copolymerization of propylene with other olefins and which are useful and preferred as metallocenes for the catalyst systems of the present invention, are well known in the literature. As an example, such metallocenes are disclosed in U.S. Pat. Nos. 4,530,914; 4,542,199; 4,769,910; 4,808,561; 4,871,705; 4,931,417; 4,933,403; 4,937,299; 5,017,714; 5,026,798; 5,057,475; 5,120,867; 5,132,381; 5,145,819; 5,155,180; 5,198,401; 5,239,022; 5,243,001; 5,276,208; 5,278,119; 5,296,434; 5,304,614; 5,324,800; 5,328,969; 5,329,033; 5,350,723; 5,374,752; 5,391,790; 5,416,178; 5,436,305; 5,455,366; 5,510,502; 5,532,396; 5,543,373; 5,554,704; 5,576,260; 5,612,428; 5,616,663; 5,629,254; 5,635,437; 5,661,096; 5,672,668; 5,679,812; 5,723,640; 5,739,366; 5,741,868; 5,770,753; 5,786,432; 5,830,821; 5,840,644; 5,840,948; 5,852,142; 5,929,264; 5,932,669; 6,017,841; 6,051,522; 6,051,727; 6,057,408; 6,087,291; 6,100,214; 6,114,479; 6,117,955; 6,124,230; 6,140,432; 6,194,341; 6,218,558; 6,228,795; 6,242,544; 6,245,706; 6,252,097; 6,255,506; 6,255,515; 6,376,407; 6,376,408; 6,376,409; 6,376,410; 6,376,411; 6,376,412; 6,376,413; 6,376,627; 6,380,120; 6,380,121; 6,380,122; 6,380,123; 6,380,124; 6,380,330; 6,380,331; 6,380,334; 6,399,723; 6,444,606; 6,469,114 and U.S. Application Nos. 2001021755; 20030149199 and EP 576 970; EP 611 773, and WO 97/32906; WO 98/014585; WO 98/22486; WO 00/12565; WO 01/48034; WO 03/045964; WO 03/106470.

The interest in these homogeneous single site catalysts originates from the ability to produce polyolefins that can not be synthesized by using conventional Ziegler-Natta catalyst, for example polyolefins having a very narrow molar mass distribution and a uniform comonomer content. In order to obtain active catalysts for olefin polymerizations the metallocene complexes have to be reacted with a cocatalyst. The most frequently used cocatalysts consist of aluminoxanes, such as methylaluminoxane. The disadvantage of these cocatalysts is that they have to be used in large excess. Therefore these catalyst systems are quite expensive. Other type of cocatalysts exist that convert the metallocene complexes into cationic complexes. These type of cocatalysts can be used in stoichiometric or virtually stoichiometric ratios (Chem. Rev. 2000, 100, 1391-1434).

In polymerizations using such soluble, homogeneous catalyst systems, heavy deposits are formed on reactor walls and the stirrer if the polymer is obtained as a solid. These deposits are formed by agglomeration of the polymer particles whenever metallocene and/or cocatalyst are present in dissolved form in the suspension. The deposits in the reactor systems quickly reach considerable thickness and have a high strength. They prevent heat exchange to the cooling medium and therefore have to be removed regularly. Such homogeneous catalyst systems cannot be used industrially in liquid monomer or in the gas phase. To avoid deposit formation in the reactor, supported catalyst systems in which the metallocene and/or the cocatalyst is/are fixed on an inorganic support material have been proposed. As an example, in EP-A-0 576 970 or WO 01/48034 metallocenes and corresponding supported catalyst systems are disclosed. Such supported catalyst systems give polymers, in particular polypropylenes, having melting points of up to about 156° C.

Furthermore industrial utilization of metallocene catalysts requires the catalyst system to be made heterogeneous in order to achieve an appropriate morphology of the resulting polymer. It has been shown advantageous to covalently fix the components of the catalyst system to the support. This avoids the detachment of the of the catalyst system from the support which leads to homogeneous polymerisations and unsatisfactory polymer morphology.

WO 96/04319, WO 96/23005 and WO 99/33881 describe catalyst systems in which the cocatalyst, a Lewis acid like tris(pentafluorophenyl)borane, is covalently bound to the support material. However these catalyst systems have a low polymerisation activity and no organic compounds having functional groups containing active hydrogen are used for the preparation of the catalyst system.

The patents WO 99/40129, WO 00/62928 and WO 01/47635 teach the use of a Lewis-base, a compound that is obtainable by a reaction of an organometallic compound with an organic compound bearing a functional group containing active hydrogen, a metallocene, and a support as components of the catalyst system. The patents WO 04/007570 and WO 04/007569 teach the preparation of similar catalysts systems by a simpler process that requires fewer purification steps. However all of these catalyst systems still show a rather low polymerisation activity.

It is an object of this invention to provide a catalyst system which avoids the disadvantages of the prior art and furthermore has an increased polymerisation activity, guarantees good polymer morphology and leads to polymerisations without formation of deposits in the reactor.

We have found that this object is achieved by a catalyst system based on a specific stoichiometric ratio of the catalyst components, which unexpectedly displays very high polymerization activities and gives a good polymer morphology.

SUMMARY

The catalyst system of the present invention comprises
(A) at least one metallocene,
(B) at least one Lewis base,
(C) at least one support,
(D) at least one organic compound having at least one functional group containing active hydrogen,
(E) at least one organometallic compound.

The stoichiometry ratio of the organic compound (D) and the organometallic compound (E) preferably ranges from about 3:1 to about 5:1.

DETAILED DESCRIPTION OF PREFERRED EMBODIMENT(S)

As organic transition metal compound A), it is in principle possible to use any compounds of the transition metals of groups 3 to 12 of the Periodic Table or the lanthanides which contain organic groups and preferably form active olefin polymerization catalysts after reaction with the components B) and C). These are usually compounds in which at least one monodentate or polydentate ligand is bound to the central atom via sigma or pi bonds. Possible ligands include ones containing cyclopentadienyl radicals and also ones which are free of cyclopentadienyl radicals. A large number of such compounds A) suitable for olefin polymerization are described in Chem. Rev. 2000, Vol. 100, No. 4. Furthermore, polycyclic cyclopentadienyl complexes are also suitable for olefin polymerization.

As metallocene component A) of the catalyst system of the present invention, use is made of at least one compound of the formula 1 below. The term metallocene component is thereby understood to be an organic transition metal compound as depicted in formula 1 that bears at least one substituted or unsubstituted cylcopentadienly group.

$$(R^9)_n(L^1)_m M^1(R^1)_q \qquad \text{(Formula 1)}$$

where
n is 0 or 1,
m is 1, 2 or 3
q is 1, 2 or 3 and
the sum of m and q equals the oxidation state of $M^1$ $L^1$ are identical or different and are each a substituted or unsubstituted mononuclear or polynuclear hydrocarbon radical or (a) hetero atom(s) containing hydrocarbon radical(s), for example substituted or unsubstituted cyclopentadienyl, indenyl, tetrahydroindenyl, azurenyl, fluorenyl, azapentalenyl, thiapentalenyl or oxapentalenyl, that coordinates to $M^1$, $R^1$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and two or three $R^1$ can form one or more ring system(s), $M^1$ is a metal of group IVb of the Periodic Table of the Elements,
$R^9$ is a bridging group linking two ligands $L^1$

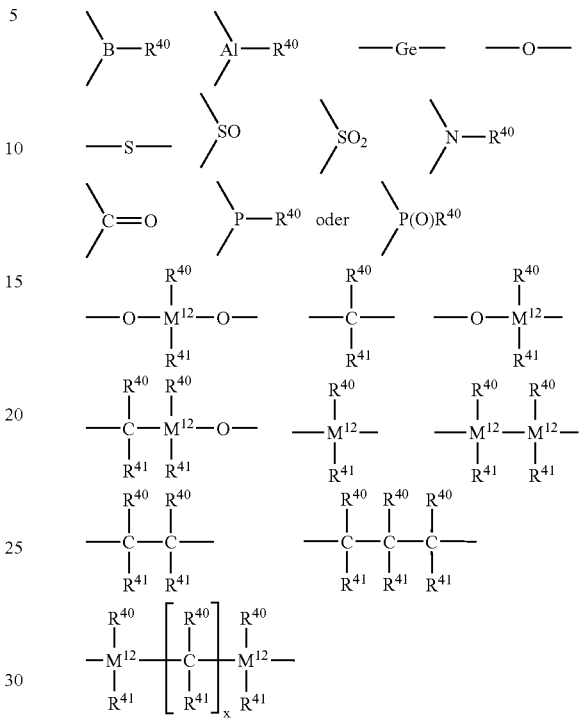

where
$R^{40}$ and $R^{41}$, even when bearing the same index, can be identical or different and are each a hydrogen atom, a $C_1$-$C_{40}$ group such as an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group,or an arylalkenyl 10 group of from 8 to about 40 carbon atoms. $R^{40}$ and $R^{41}$ together with the atoms connecting them can form one or more cyclic systems or $R^{40}$ and/or $R^{41}$ can contain additional hetero atoms (i.e., non-carbon atoms) like Si, B, Al, O, S, N or P or halogen atoms like Cl or Br,
x is an integer from 1 to 18,
$M^{12}$ is silicon, germanium or tin, and
$R^9$ may also link two units of the formula 1 to one another, or $R^9$ forms a $R^9$-$Z^1$ group, with $R^9$ being linked to one $L^1$ group and $Z^1$ being linked to $M^1$,
where
$Z^1$ comprises nitrogen, phosphorus, oxygen or sulfur such as —O—, —S—, —$NR^{42}$ or $PR^{42}$—,
where
$R^{42}$ is a hydrogen atom, a $C_1$-$C_{40}$ group such as an alkyl group having from 1 to about 30 carbon atoms, a cycloalkyl group of from 3 to 10 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group, an arylalkenyl group of from 8 to about 40 carbon atoms, and $R^{42}$ can contain additional hetero atoms (i.e., non-carbon atoms) like Si, B, Al, O, S, N or P or halogen atoms like Cl or Br.

As metallocene component of the catalyst system of the present invention, preference is given to use at least one compound of the formula 1a below,

 (Formula 1a)

where $L^1$ and $L^2$ are identical or different and are each a substituted mononuclear or polynuclear hydrocarbon radical or (a) hetero atom(s) containing hydrocarbon radical(s), for example substituted cyclopentadienyl, indenyl, tetrahydroindenyl, azurenyl, fluorenyl, azapentalenyl, thiapentalenyl or oxapentalenyl, which can form a sandwich structure with the central atom $M^1$, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and $R^1$ and $R^2$ can form one or more ring system(s), $M^1$ is a metal of group IVb of the Periodic Table of the Elements, $R^9$ is a bridge between the ligands $L^1$ and $L^2$,

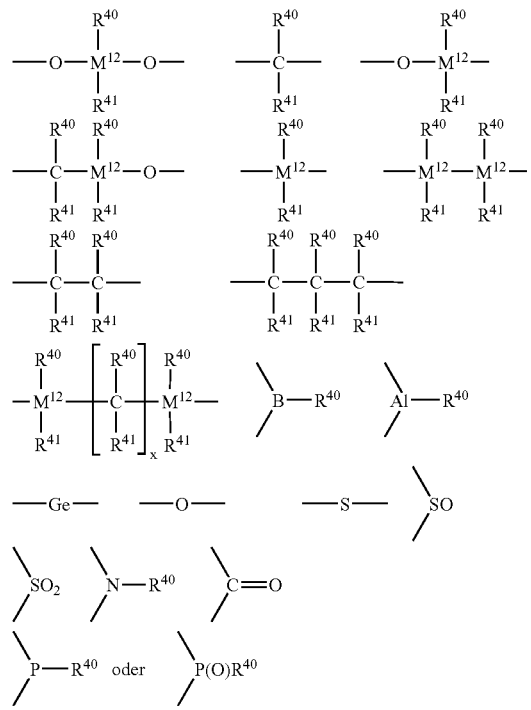

where $R^{40}$ and $R^{41}$, even when bearing the same index, can be identical or different and are each a hydrogen atom, a $C_1$-$C_{40}$ group such as an alkyl group having from 1 to about 30 carbon atoms, an aryl group of from 6 to about 40 carbon atoms, a fluoroalkyl group of from 2 to about 10 carbon atoms, an alkoxy group of from 1 to about 10 carbon atoms, an aryloxy group of from 6 to about 10 carbon atoms, an alkenyl group of from 2 to about 1 0 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group,or an arylalkenyl group of from 8 to about 40 carbon atoms. $R^{40}$ and $R^{41}$ together with the atoms connecting them can form one or more cyclic systems or $R^{40}$ and/or $R^{41}$ can contain additional hetero atoms (i.e., non-carbon atoms) like Si, B, Al, O, S, N or P or halogen atoms like Cl or Br, x is an integer from 1 to 18, $M^{12}$ is silicon, germanium or tin, and $R^9$ may also link two units of the formula 1a to one another.

In formula 1a it is preferred that $M^1$ is zirconium or hafnium,

L1 and L2 are identical or different and are each a substituted cyclopentadienyl, indenyl, tetrahydroindenyl, azurenyl, fluorenyl, azapentalenyl, thiapentalenyl or oxapentalenyl, which can form a sandwich structure with the central atom $M^1$, $R^9$ is $R^{40}R^{41}Si=$, $R^{40}R^{41}Ge=$, $R^{40}R^{41}C=$ or $-(R^{40}R^{41}C-CR^{40}R^{41})-$, where $R^{40}$ and $R^{41}$ are identical or different and are each a hydrogen atom, a hydrocarbon group of from 1 to about 30 carbon atoms, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, a alkyl(aryl)silyl or a arylsilyl group.

In formula 1a it is very particularly preferred that $M^1$ is zirconium and $L^1$ and $L^2$ are identical or different and are each a substituted indenyl, azurenyl, fluorenyl, azapentalenyl, thiapentalenyl or oxapentalenyl, which can form a sandwich structure with the central atom $M^1$, and the bridging unit $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclo-pentyl, cyclo-pentadienyl, cyclohexyl, phenyl, benzyl, trimethylsilyl or 3,3,3-trifluoropropyl.

More preferred, as the metallocene component of the catalyst system of the present invention, use is made of at least one compound of the formula 1b below

 (Formula 1b)

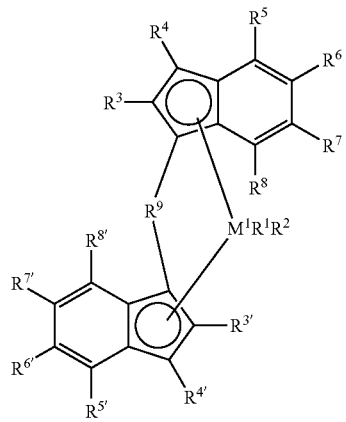

where the substituents and indices have the following meanings:

$M^1$ is a metal of group IVb of the Periodic Table of the Elements, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms and $R^1$ and $R^2$ may form one or more ring system(s), $R^3$, $R^4$, $R^5$, $R^6$, $R^7$, $R^8$ and also $R^{3'}$, $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms or a substituted or unsubstituted alkylsilyl group, a alkyl(aryl)silyl group or a arylsilyl group, with the proviso that $R^3$ and $R^{3'}$ are not hydrogen. The groups may contain one or more hetero atoms like Si, B, Al, O, S, N or P, and/or may contain halogen atoms like F, Cl or Br, and/or two adjacent radicals $R^5$, $R^6$ or $R^{5'}$, $R^{6'}$, or $R^6$, $R^7$ or $R^{6'}$, $R^{7'}$, or $R^7$, $R^8$ or $R^{7'}$, $R^{8'}$ in each case may form a hydrocarbon ring system and the bridging unit $R^9$ has the meaning set forth above with respect to formula 1a.

The 4,5,6,7-tetrahydroindenyl and the (a) heteroatom(s) containing indenyl analogues corresponding to the compounds 1b are likewise of importance.

In formula 1b it is preferred that $M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, or $R^1$ and $R^2$ together may form one or more ring system(s), $R^3$ and $R^{3'}$, are identical or different and are each a linear, cyclic or branched hydrocarbon group which may be halogenated, for example an alkyl group of from 1 to 10 carbon atoms or an alkenyl group of from 2 to about 10 carbon atoms, $R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 10 carbon atoms, which may contain one or more hetero atoms like Si, B, Al, O, S, N or P, and/or may contain halogen atoms like F, Cl or Br, and/or the two adjacent radicals $R^5$, $R^6$ and $R^{5'}$, $R^{6'}$ may form a hydrocarbon ring system, $R^9$ is $R^{40}R^{41}Si{=}$, $R^{40}R^{41}Ge{=}$, $R^{40}R^{41}C{=}$ or $-(R^{40}R^{41}C-CR^{40}R^{41})-$, where $R^{40}$ and $R^{41}$ are identical or different and are each a hydrogen atom, a $C_1$-$C_{30}$-hydrocarbon group, in particular an alkyl group of from 1 to 10 carbon atoms, an aryl group of from 6 to about 40 carbon atoms, an arylalkyl group of from 7 to about 14 carbon atoms or an alkylaryl group of from 7 to about 14 carbon atoms or a substituted or unsubstituted alkylsilyl group, a alkyl(aryl)silyl or a arylsilyl group.

The 4,5,6,7-tetrahydroindenyl and the (a) heteroatom(s) containing indenyl analogues corresponding to the compounds 1b are likewise of importance.

In formula 1b it is very particularly preferred that $M^1$ is zirconium, $R^1$ and $R^2$ are identical or different and are methyl, chlorine or phenolate, $R^3$ and $R^{3'}$, are identical or different and are each a linear, cyclic or branched hydrocarbon group which may be halogenated, for example an alkyl group of from 1 to about 10 carbon atoms or an alkenyl group of from 2 to about 10 carbon atoms, $R^4$ and also $R^{4'}$ are hydrogen, $R^5$, $R^6$, $R^7$, $R^8$ and also $R^{5'}$, $R^{6'}$, $R^{7'}$, $R^{8'}$ are identical or different and are each a hydrogen atom or a linear, cyclic or branched alkyl group of from 1 to about 10 carbon atoms, or an aryl group of from 6 to about 10 carbon atoms and/or the two adjacent radicals $R^5$, $R^6$ and $R^{5'}$, $R^{6'}$ respectively together may form a ring system, $R^9$ is $R^{40}R^{41}Si{=}$ or $R^{40}R^{41}Ge{=}$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, benzyl, trimethylsilyl or 3,3,3-trifluoropropyl.

Most preferred for the production of polypropylenes with high melting points for applications, where a high stiffness is required, as the metallocene component of the catalyst system of the present invention, use is made of at least one compound of the formula 1c below

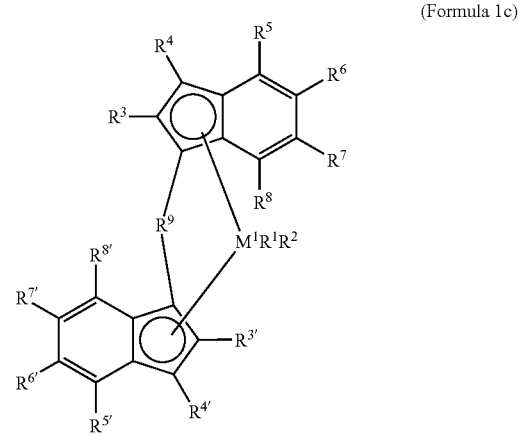

(Formula 1c)

where the substituents and indices have the following meanings:

$M^1$ is a metal of group IVb of the Periodic Table of the Elements, $R^1$ and $R^2$ are identical or different and are each a hydrogen atom, an alkyl group of from 1 to 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and $R^1$ and $R^2$ may form one or more ring system(s), $R^3$, $R^4$, $R^5$, $R^6$, $R^7$, $R^8$ and also $R^{3'}$, $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to 10 carbon atoms, an alkenyl group of from 2 to about 10 carbon atoms, an arenyl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, a substituted or unsubstituted alkylsilyl or arylsilyl group, with the proviso that $R^3$ and $R^{3'}$ are not hydrogen and that $R^5$ and $R^{5'}$ are identical or different and are each a substituted or unsubstituted aryl group of from 6 to about 40 carbon atoms. The hydrocarbon groups may contain one or more hetero atoms like Si, B, Al, O, S, N or P, and/or may contain halogen atoms like F, Cl or Br, and the bridging unit $R^9$ has the meaning set forth above with respect to formula 1a.

The 4,5,6,7-tetrahydroindenyl and the (a) heteroatom(s) containing indenyl analogues corresponding to the compounds 1c are likewise of importance.

In formula 1c it is preferred that $M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms, or a halogen atom, and $R^1$ and $R^2$ may form one or more ring system(s), $R^3$ and $R^{3'}$, are identical or different and are each a linear, cyclic or branched group which may be halogenated, for example an alkyl group of from 1 to about 10 carbon atoms or an alkenyl group of from 2 to about 10 carbon atoms, $R^4$, $R^6$, $R^7$, $R^8$ and also $R^{4'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are each a substituted or unsubstituted aryl group of from 6 to about 40 carbon atoms, $R^9$ is $R^{40}R^{41}Si{=}$, $R^{40}R^{41}Ge{=}$, R $R^{41}C{=}$ or $-(R^{40}R^{41}C-CR^{40}R^{41})-$, where $R^{40}$ and $R^{41}$ are identical or different and are each a hydrogen atom, a $C_1$-$C_{30}$-hydrocarbon group, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, a alkyl(aryl)silyl or a arylsilyl group.

The 4,5,6,7-tetrahydroindenyl and the (a) heteroatom(s) containing indenyl analogues corresponding to the compounds 1c are likewise of importance.

In formula 1c it is very particularly preferred that $M^1$ is zirconium, $R^1$ and $R^2$ are identical and are methyl, chlorine, or phenolate, $R^3$ and $R^{3'}$ are identical or different and are each a linear, cyclic or branched methyl, ethyl, propyl, butyl, pentyl or hexyl, $R^4$ and also $R^{4'}$ are hydrogen, $R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are phenyl, naphthyl, para-($C_1$-$C_{10}$-alkyl)phenyl, para-($C_1$-$C_{10}$-fluoroalkyl)phenyl, meta-($C_1$-$C_{10}$-alkyl)phenyl, meta-($C_1$-$C_{10}$-alkyl)phenyl, meta, meta'-($C_1$-$C_{10}$-alkyl)$_2$phenyl or meta, meta'-($C_1$-$C_{10}$-fluoroalkyl)$_2$phenyl, $R^9$ is $R^{40}R^{41}Si{=}$ or $R^{40}R^{41}Ge{=}$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, benzyl, trimethylsilyl or 3,3,3-trifluoropropyl.

Most preferred for the production of high molecular weight random copolymers or of copolymer rubber, for the production of impact copolymers comprising high molecular weight copolymers or for the production of polypropylenes with melting points higher than 155° C. for applications, where a high stiffness is required, as the metallocene component of the catalyst system of the present invention use is made of at least one compound of the formula 1d below,

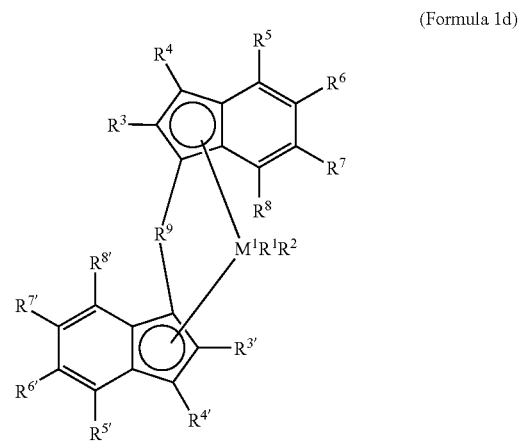

(Formula 1d)

where the substituents and indices have the following meanings:

$M^1$ is a metal of group IVb of the Periodic Table of the Elements, $R^1$ and $R^2$ are identical or different and are each a hydrogen atom, an alkyl group of from 1 to about 10 carbon atoms, an alkoxy group of from 1 to about 10 carbon atoms, an aryl group of from 6 to 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms, or an aryl group of from 6 to about 14 carbon atoms, or $R^1$ and $R^2$ together may form one or more ring system(s), $R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom, a linear, cyclic or branched hydrocarbon group, for example an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, a substituted or unsubstituted alkylsilyl or arylsilyl group, with the proviso that $R^5$ and $R^{5'}$ are identical or different and are each a substituted or unsubstituted aryl group of from 6 to about 40 carbon atoms. The hydrocarbon groups may contain one or more hetero atoms like Si, B, Al, O, S, N or P, and/or may contain halogen atoms like F, Cl or Br, $R^3$ is a hydrocarbon group, not cyclic or branched in the α-position, for example an alkyl group of from 1 to 20 carbon atoms, an aryl substituted alkyl group of from 7 to about 40 carbon atoms, or an aryl substituted alkenyl group of from 8 to about 40 carbon atoms. The hydrocarbon groups may contain one or more hetero atoms like Si, B, Al, O, S, N or P, and/or may contain halogen atoms like F, Cl or Br, $R^{3'}$ is a in α-position or in β-position cyclic or branched hydrocarbon group, for example an alkyl group of from 3 to about 20 carbon atoms, an alkenyl group of from 3 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms. The hydrocarbon groups may contain one or more hetero atoms like Si, B, Al, O, S, N or P, and/or may contain halogen atoms like F, Cl or Br, and the bridging unit $R^9$ has the meaning mentioned above with respect to formula 1a.

In formula 1d it is preferred that $M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, and $R^1$ and $R^2$ may form one or more ring system(s), $R^3$ is a linear alkyl group of from 1 to about 10 carbon atoms or an alkenyl group of from 2 to 10 carbon atoms, which can be halogenated, $R^{3'}$ is a in α-position or in β-position cyclic or branched alkyl group of from 3 to about 20 carbon atoms, an alkenyl group of from 3 to about 20 carbon atoms, an alkylaryl group of from 7 to about 20 carbon atoms, or a trimethylsilyl group, $R^4$, $R^6$, $R^7$, $R^8$ and also $R^{4'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are each a substituted or unsubstituted aryl group of from 6 to about 40 carbon atoms, like phenyl, naphthyl, para-($C_1$-$C_{10}$-alkyl)phenyl, meta-($C_1$-$C_{10}$-alkyl)phenyl, meta, meta'-($C_1$-$C_{10}$-alkyl)$_2$phenyl, $R^9$ is $R^{40}R^{41}Si=$, $R^{40}R^{41}Ge=$, $R^{40}R^{41}C=$ or $—(R^{40}R^{41}C—CR^{40}R^{41})—$, where $R^{40}$ and $R^{41}$ are identical or different and are each a hydrogen atom, a $C_1$-$C_{30}$ group, in particular an alkyl group of from 1 to about 10 carbon atoms, an aryl group of from 6 to about 40 carbon atoms, an arylalkyl group of from 7 to 14 carbon atoms, an alkylaryl group of from 7 to 14 carbon atoms or a substituted or unsubstituted alkylsilyl group, a alkyl(aryl)silyl or a arylsilyl group.

The 4,5,6,7-tetrahydroindenyl and the (a) heteroatom(s) containing indenyl analogues corresponding to the compounds 1d are likewise of importance.

In formula 1d, it is very particularly preferred that $M^1$ is zirconium, $R^1$ and $R^2$ are identical and are methyl, chlorine, or phenolate, $R^3$ is methyl, ethyl, n-propyl, n-butyl, n-pentyl or n-hexyl, $R^{3'}$ is iso-propyl, iso-butyl, n-butyl, sec-butyl, cyclobutyl, 1-methyl-butyl, 1-ethyl-butyl, 1-methyl-pentyl, cyclopentyl, cyclohexyl, cyclopent-2-enyl, cyclopent-3-enyl, cyclohex-2-enyl, cyclohex-3-enyl, para-methyl-cyclohexyl or trimethylsilyl, $R^4$ and also $R^{4'}$ are hydrogen, and $R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms like Si, B, Al, O, S, N or P, and/or may contain halogen atoms like F, Cl or Br, $R^5$ and $R^{5'}$ are identical or different and are phenyl, p-isopropyl-phenyl, p-tert.-butyl-phenyl, p-s-butyl-phenyl, p-cyclohexyl, p-trimethylsilyl-phenyl, p-adamantyl-phenyl, p-(trisfluor)trimethyl-phenyl or m,m'-dimethyl-phenyl, $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclo-pentyl, cyclo-pentadienyl, cyclohexyl, phenyl, benzyl, trimethylsilyl or 3,3,3-trifluoropropyl.

Not limiting examples for the particularly preferred metallocene compounds of the present invention are the following compounds of formulas 1a-1d:

A-(2-isopropyl-4-(p-isopropyl-phenyl)indenyl)(2-methyl-4-(p-isopropyl-phenyl)-indenyl)zirconiumdichloride, A-(2-isopropyl-4-(p-tert.butyl-phenyl)indenyl)(2-methyl-4-(p-tert.butyl-phenyl)-indenyl)zirconiumdichloride, A-(2-isopropyl-4-(p-tert.butyl-phenyl)indenyl)(2,7-dimethyl-4-(p-tert.butyl-phenyl)indenyl)zirconiumdichloride, A-(2-isopropyl-4-(p-tert.butyl-phenyl)indenyl)(2,5,6,7-tetramethyl-4-(p-tert. butyl-phenyl)indenyl)zirconiumdichloride, A-(2-isopropyl-6-methyl-4-(p-tert.butyl-phenyl)indenyl)(2,6-dimethyl-4-(p-tert. butyl-phenyl)indenyl)zirconiumdichloride, A-(2-isopropyl-4-(p-sec.butyl-phenyl)indenyl)(2-methyl-4-(p-sec.butyl-phenyl)-indenyl)zirconiumdichloride, A-(2-isopropyl-4-(p-cyclohexyl-phenyl)indenyl)(2-methyl-4-(p-cyclohexyl-phenyl)-indenyl)zirconiumdichloride, A-(2-isopropyl-4-(p-trimethylsilyl-phenyl)indenyl)(2-methyl-4-(p-trimethylsilyl-phenyl)indenyl)zirconiumdichloride, A-(2-isopropyl-4-(p-adamantyl-phenyl)indenyl)(2-methyl-4-(p-adamantyl-phenyl)indenyl)zirconiumdichloride, A-(2-isopropyl-4-(p-tris(trifluoromethyl)methyl-phenyl)indenyl)(2-methyl-4-(p-tris(trifluoromethyl)methyl-phenyl)indenyl)zirconiumdichloride, A-(2-isopropyl-4-phenyl-indenyl)(2-methyl-4-(p-tert.butyl-phenyl)indenyl)-zirconiumdichloride;

A-(2-isopropyl-4-(p-tert.butyl-phenyl)indenyl)(2-methyl-4-phenyl-indenyl)-zirconiumdichloride, A-(2-isopropyl-4-(p-tert.butyl-phenyl)indenyl)(2,7-dimethyl-4-phenyl-indenyl)-zirconiumdichloride, A-(2-isopropyl-4-(p-tert.butyl-phenyl)indenyl)(2,5,6,7-tetramethyl4-phenyl-indenyl)zirconiumdichloride, A-(2-isopropyl-6-methyl-4-(p-tert.butyl-phenyl)indenyl)(2,6-dimethyl-4-phenyl-indenyl)zirconiumdichloride, A-(2-isopropyl-4-phenyl-indenyl)(2,7-dimethyl-4-(p-tert.butyl-phenyl)-indenyl)-zirconiumdichloride, A-(2-isopropyl-4-phenyl-indenyl)(2,5,6,7-tetramethyl-4-(p-tert.butyl-phenyl)-indenyl)zirconiumdichloride, A-(2-isopropyl-6-methyl-4-phenyl-indenyl)(2,6-dimethyl4-(p-tert.butyl-phenyl)-indenyl)zirconiumdichloride, A-(2-isopropyl-4-(p-tert.butyl-phenyl)indenyl)(2-methyl4-(4-naphthyl)-indenyl)-indenyl)-zirconiumdichloride, A-(2-isopropyl-4-(4-naphthyl)-indenyl)indenyl)(2-methyl4-(p-tert.butyl-phenyl)-indenyl)zirconiumdichloride, A-bis(4-naphthyl-indenyl)zirconiumdichloride, A-bis(2-methyl-benzo-indenyl)zirconiumdichloride A-bis(2-methyl-indenyl)zirconiumdichloride, A-bis(2-methyl-4-(1-naphthyl)-indenyl)zirconiumdichloride,
A-bis(2-methyl4-(2-naphthyl)-indenyl)zirconiumdichloride,
A-bis(2-methyl4-phenyl-indenyl)zirconiumdichloride,
A-bis(2-methyl4-t-butyl-indenyl)zirconiumdichloride,
A-bis(2-methyl-4-isopropyl-indenyl)zirconiumdichloride,
A-bis(2-methyl4-ethyl-indenyl)zirconiumdichloride,
A-bis(2-methyl-4-acenaphth-indenyl)zirconiumdichloride,
A-bis(2,4-dimethyl-indenyl)zirconiumdichloride,
A-bis(2-ethyl-indenyl)zirconiumdichloride,
A-bis(2-ethyl-4-ethyl-indenyl)zirconiumdichloride,
A-bis(2-ethyl-4-phenyl-indenyl)zirconiumdichloride,
A-bis(2-methyl-4,6-diisopropyl-indenyl)zirconiumdichloride,
A-bis(2-methyl-4,5-diisopropyl-indenyl)zirconiumdichloride,
A-bis(2,4,6-trimethyl-indenyl)zirconiumdichloride,
A-bis(2,5,6-trimethyl-indenyl)zirconiumdichloride,
A-bis(2,4,7-trimethyl-indenyl)zirconiumdichloride,
A-bis(2-methyl-5-isobutyl-indenyl)zirconiumdichloride,
A-bis(2-methyl-5-t-butyl-indenyl)zirconiumdichloride,
A-bis(2-methyl-4-(tert-butyl-phenyl)-indenyl)zirconiumdichloride,
A-bis(2-methyl-4-(4-methyl-phenyl)-indenyl)zirconiumdichloride,
A-bis(2-methyl-4-(4-ethyl-phenyl)-indenyl)zirconiumdichloride,
A-bis(2-methyl-4-(4-trifluoromethyl-phenyl)-indenyl)zirconiumdichloride,
A-bis(2-methyl-4-(4-methoxy-phenyl)-indenyl)zirconiumdichloride,
A-bis(2-ethyl-4-(4-tert-butyl-phenyl)-indenyl)zirconiumdichloride,
A-bis(2-ethyl-4-(4-methyl-phenyl)-indenyl)zirconiumdichloride,
A-bis(2-ethyl-4-(4-ethyl-phenyl)-indenyl)zirconiumdichloride,
A-bis(2-ethyl-4-(4-trifluoromethyl-phenyl)-indenyl)zirconiumdichloride,
A-bis(2-ethyl-4-(4-methoxy-phenyl)-indenyl)zirconiumdichloride,
A-bis(2-methyl-4-(4-tert-butyl-phenyl)-indenyl)zirconiumdimethyl,
A-bis(2-methyl-4-(4-methyl-phenyl)-indenyl)zirconiumdimethyl,
A-bis(2-methyl-4-(4-ethyl-phenyl)-indenyl)zirconiumdimethyl,
A-bis(2-methyl-4-(4-trifluoromethyl-phenyl)-indenyl)zirconiumdimethyl,
A-bis(2-methyl-4-(4-methoxy-phenyl)-indenyl)zirconiumdimethyl,
A-bis(2-ethyl-4-(4-tert-butyl-phenyl)-indenyl)zirconiumdimethyl,
A-bis(2-ethyl-4-(4-methyl-phenyl)-indenyl)zirconiumdimethyl,
A-bis(2-ethyl-4-(4-ethyl-phenyl)-indenyl)zirconiumdimethyl,
A-bis(2-ethyl-4-(4-trifluoromethyl-phenyl)-indenyl)zirconiumdimethyl,
A-bis(2-ethyl-4-(4-methoxy-phenyl)-indenyl)zirconiumdimethyl,
A-bis(2-isopropyl-4-(tert-butyl-phenyl)-indenyl)zirconiumdichloride,
A-bis(2-isopropyl-4-(4-methyl-phenyl)-indenyl)zirconiumdichloride,
A-bis(2-isopropyl-4-(4-ethyl-phenyl)-indenyl)zirconiumdichloride,
A-bis(2-isopropyl-4-(4-trifluoromethyl-phenyl)-indenyl)zirconiumdichloride,
A-bis(2-isopropyl-4-(4-methoxy-phenyl)-indenyl)zirconiumdichloride,
A-bis(2-isopropyl-4-(4'-tert.-butyl-phenyl)-indenyl)zirconiumdichloride,
A-bis(2-isopropyl-4-(4'-tert.-butyl-phenyl)-indenyl)hafniumdichloride,
A-bis(2-isopropyl-4-(4'-tert.-butyl-phenyl)-indenyl)titaniumdichloride,
A-bis(2-isopropyl-4-(4'-methyl-phenyl)-indenyl)zirconiumdichloride,
A-bis(2-isopropyl-4-(4'-n-propyl-phenyl)-indenyl)zirconiumdichloride,
A-bis(2-isopropyl-4-(4'-n-butyl-phenyl)-indenyl)zirconiumdichloride,
A-bis(2-isopropyl-4-(4'-hexyl-phenyl)-indenyl)zirconiumdichloride,
A-bis(2-isopropyl-4-(4'-sec-butyl-phenyl)-indenyl)zirconiumdichloride,
A-bis(2-isopropyl-4-phenyl)-indenyl)zirconiumdichloride,
A-bis(2-isopropyl-4-(4'-methyl-phenyl)-indenyl)zirconiumdichloride,
A-bis(2-isopropyl-4-(4'-ethyl-phenyl)-indenyl)zirconiumdichloride,
A-bis(2-isopropyl-4-(4'-n-propyl-phenyl)-indenyl)zirconiumdichloride,
A-bis(2-isopropyl-4-(4'-n-butyl-phenyl)-indenyl)zirconiumdichloride,
A-bis(2-isopropyl-4-(4'-hexyl-phenyl)-indenyl)zirconiumdichloride,
A-bis(2-isopropyl-4-(4'-pentyl-phenyl)-indenyl)zirconiumdichloride,
A-bis(2-isopropyl-4-(4'-cyclohexyl-phenyl)-indenyl)zirconiumdichloride,
A-bis(2-isopropyl-4-(4'-sec-butyl-phenyl)-indenyl)zirconiumdichloride,
A-bis(2-isopropyl-4-(4'-tert.-butyl-phenyl)-indenyl)zirconiumdichloride,
A-bis(2-methyl-4-(4'-tert.-butyl-phenyl)-indenyl)zirconiumdichloride,
A-bis(2-methyl-4-(4'-tert.-butyl-phenyl)-indenyl)hafniumdichloride,
A-bis(2-methyl-4-(4'-tert.-butyl-phenyl)-indenyl)titaniumdichloride,
A-bis(2-methyl-4-(4'-methyl-phenyl)-indenyl)zirconiumdichloride,
A-bis(2-methyl-4-(4'-n-propyl-phenyl)-indenyl)zirconiumdichloride,
A-bis(2-methyl-4-(4'-n-butyl-phenyl)-indenyl)zirconiumdichloride,
A-bis(2-methyl-4-(4'-hexyl-phenyl)-indenyl)zirconiumdichloride,
A-bis(2-methyl-4-(4'-sec-butyl-phenyl)-indenyl)zirconiumdichloride,
A-bis(2-ethyl-4-phenyl-indenyl)zirconiumdichloride,
A-bis(2-ethyl-4-(4'-methyl-phenyl)-indenyl)zirconiumdichloride,
A-bis(2-ethyl-4-(4'-ethyl-phenyl)-indenyl)zirconiumdichloride,
A-bis(2-ethyl-4-(4'-n-propyl-phenyl)-indenyl)zirconiumdichloride, A-bis(2-ethyl-4-(4'-n-butyl-phenyl)-indenyl)zirconiumdichloride,
A-bis(2-ethyl-4-(4'-hexyl-phenyl)-indenyl)zirconiumdichloride,
A-bis(2-ethyl-4-(4'-pentyl-phenyl)-indenyl)zirconiumdichloride,
A-bis(2-ethyl-4-(4'-cyclohexyl-phenyl)-indenyl)zirconiumdichloride,
A-bis(2-ethyl-4-(4'-sec-butyl-phenyl)-indenyl)zirconiumdichloride,
A-bis(2-ethyl-4-(4'-tert.-butyl-phenyl)-indenyl)zirconiumdichloride,
A-bis(2-n-propyl-4-phenyl-indenyl)zirconiumdichloride,
A-bis(2-n-propyl-4-(4'-methyl-phenyl)-indenyl)zirconiumdichloride,
A-bis(2-n-propyl-4-(4'-ethyl-phenyl)-indenyl)zirconiumdichloride,
A-bis(2-n-propyl-4-(4'-iso-propyl-phenyl)-indenyl)zirconiumdichloride,
A-bis(2-n-propyl-4-(4'-n-butyl-phenyl)-indenyl)zirconiumdichloride,
A-bis(2-n-propyl-4-(4'-hexyl-phenyl)-indenyl)zirconiumdichloride,
A-bis(2-n-propyl-4-(4'-cyclohexyl-phenyl)-indenyl)zirconiumdichloride,
A-bis(2-n-propyl-4-(4'-sec-butyl-phenyl)-indenyl)zirconiumdichloride,
A-bis(2-n-propyl-4-(4'-tert.-butyl-phenyl)-indenyl)zirconiumdichloride,
A-bis(2-n-butyl-4-phenyl-indenyl)zirconiumdichloride,
A-bis(2-n-butyl-4-(4'-methyl-phenyl)-indenyl)zirconiumdichloride,
A-bis(2-n-butyl-4-(4'-ethyl-phenyl)-indenyl)zirconiumdichloride,
A-bis(2-n-butyl-4-(4'-n-propyl-phenyl)-indenyl)zirconiumdichloride,
A-bis(2-n-butyl-4-(4'-iso-propyl-phenyl)-indenyl)zirconiumdichloride,
A-bis(2-n-butyl-4-(4'-n-butyl-phenyl)-indenyl)zirconiumdichloride,
A-bis(2-n-butyl-4-(4'-hexyl-phenyl)-indenyl)zirconiumdichloride,
A-bis(2-n-butyl-4-(4'-cyclohexyl-phenyl)-indenyl)zirconiumdichloride,
A-bis(2-n-butyl-4-(4'-sec-butyl-phenyl)-indenyl)zirconiumdichloride,
A-bis(2-n-butyl-4-(4'-tert.-butyl-phenyl)-indenyl)zirconiumdichloride,
A-bis(2-hexyl-4-phenyl-indenyl)zirconiumdichloride,
A-bis(2-hexyl-4-(4'-methyl-phenyl)-indenyl)zirconiumdichloride,
A-bis(2-hexyl-4-(4'-ethyl-phenyl)-indenyl)zirconiumdichloride,
A-bis(2-hexyl-4-(4'-n-propyl-phenyl)-indenyl)zirconiumdichloride,
A-bis(2-hexyl-4-(4'-iso-propyl-phenyl)-indenyl)zirconiumdichloride,
A-bis(2-hexyl-4-(4'-n-butyl-phenyl)-indenyl)zirconiumdichloride,
A-bis(2-hexyl-4-(4'-n-hexyl-phenyl)-indenyl)zirconiumdichloride,
A-bis(2-hexyl-4-(4'-cyclohexyl-phenyl)-indenyl)zirconiumdichloride,
A-bis(2-hexyl-4-(4'-sec-butyl-phenyl)-indenyl)zirconiumdichloride,
A-bis(2-hexyl-4-(4'-tert.-butyl-phenyl)-indenyl)zirconiumdichloride,
A-bis(2-hexyl-4-(4'-tert.-butyl-phenyl)-indenyl)zirconiumdichloride,
A-bis(2-ethyl-4-(4'-tert.-butyl-phenyl)-indenyl)zirconiumdibenzyl,
A-bis(2-methyl-4-(4'-tert.-butyl-phenyl)-indenyl)zirconiumdimethyl,
A-(2-methyl-4-azapentalene)(2-methyl-4-(4'-methyl-phenyl) -indenyl)zirconiumdichloride,
A-(2-methyl-5-azapentalene)(2-methyl-4-(4'-methyl-phenyl) -indenyl)zirconiumdichloride,
A-(2-methyl-6-azapentalene)(2-methyl-4-(4'-methyl-phenyl) -indenyl)zirconiumdichloride,
A-(2-methyl-4-azapentalene)(2-methyl-4-(4'-ethyl-phenyl)-indenyl)zirconiumdichloride,
A-(2-methyl-4-thiapentalene)(2-methyl-4-(4'-n-propyl-phenyl)-indenyl) -zirconiumdichloride,
A-(2-methyl-4-azapentalene)(2-methyl-4-(4'-isopropyl-phenyl)-indenyl) -zirconiumdichloride,
A-(2-methyl-6-azapentalene)(2-methyl-4-(4'-isopropyl-phenyl)-indenyl) -zirconiumdichloride,
A-(2,5-dimethyl-6-thiapentalene)(2-methyl-4-(4'-isopropyl-phenyl)-indenyl) -zirconiumdichloride,
A-(2-methyl-6-oxapentalen)(2-methyl-4-(4'-isopropyl-phenyl) -indenyl)zirconiumdichloride,
A-(2-methyl-6-azapentalene)(2-methyl-4-(4'-n-butyl-phenyl) -indenyl)zirconiumdichloride,
A-(2-methyl-5-thiapentalene)(2-methyl-4-(4'-n-butyl-phenyl) -indenyl)zirconiumdichloride,
A-(2-methyl-4-oxapentalene)(2-methyl-4-(4'-n-butyl-phenyl) -indenyl)zirconiumdichloride,
A-(2-methyl-4-thiapentalene)(2-methyl-4-(4'-s-butyl-phenyl) -indenyl)zirconiumdichloride,
A-(2-methyl-4-oxapentalene)(2-methyl-4-(4'-s-butyl-phenyl) -indenyl)zirconiumdichloride,
A-(2-methyl-4-azapentalene)(2-methyl-4-(4'-tert-butyl-phenyl)-indenyl) -zirconiumdichloride,
A-(2-methyl-6-azapentalene)(2-methyl-4-(4'-tert-butyl-phenyl)-indenyl) -zirconiumdichloride,
A-(2-methyl-4-azapentalene)(2-methyl-4-(4'-n-pentyl-phenyl)-indenyl) -zirconiumdichloride,
A-(2-methyl-N-phenyl-6-azapentalene)(2-methyl-4-(4'-n-pentyl-phenyl)-indenyl) -zirconiumdichloride,
A-(2-methyl-4-oxapentalene)(2-methyl-4-(4'-n-pentyl-phenyl)-indenyl) -zirconiumdichloride,
A-(2-methyl-4-azapentalene)(2-methyl-4-(4'-n-hexyl-phenyl)-indenyl) -zirconiumdichloride,
A-(2-methyl-4-thiapentalene)(2-methyl-4-(4'-n-hexyl-phenyl)-indenyl) -zirconiumdichloride,
A-(2-methyl-6-thiapentalene)(2-methyl-4-(4'-n-hexyl-phenyl)-indenyl) -zirconiumdichloride,
A-(2,5-dimethyl-4-thiapentalene)(2-methyl-4-(4'-n-hexyl-phenyl)-indenyl) -zirconiumdichloride,
A-(2,5-dimethyl-6-thiapentalene)(2-methyl-4-(4'-n-hexyl-phenyl)-indenyl) -zirconiumdichloride,
A-(2,5-dimethyl-6-thiapentalene)(2-methyl-4-(4'-cyclohexyl-phenyl)-indenyl) -zirconiumdichloride,
A-(2-methyl-4-azapentalene)(2-methyl-4-(4'-trimethylsilyl-phenyl)-indenyl) -zirconiumdichloride,
A-(2-methyl-4-thiapentalene)(2-methyl-4-(4'-trimethylsilyl-phenyl)-indenyl) -zirconiumdichloride,
A-(2-methyl-5-thiapentalene)(2-methyl-4-(4'-trimethylsilyl-phenyl)-indenyl) -zirconiumdichloride,
A-(2-methyl-6-thiapentalene)(2-methyl-4-(4'-trimethylsilyl-phenyl)-indenyl) -zirconiumdichloride,
A-(2,5-dimethyl-4-azapentalene)(2-methyl-4-(4'-adamantyl-phenyl)-indenyl) -zirconiumdichloride, A-(2-methyl-4-thiapentalene)(2-methyl-4-(4'-adamantyl-phenyl)-indenyl)-zirconiumdichloride,
A-(2-methyl-6-thiapentalene)(2-methyl-4-(4'-adamantyl-phenyl)-indenyl)-zirconiumdichloride,
A-(2,5-dimethyl-4-thiapentalene)(2-methyl-4-(4'-adamantyl-phenyl)-indenyl)-zirconiumdichloride,
A-(2-methyl-4-azapentalene)(2-methyl-4-(4'-tris(trifluoromethyl)methyl-phenyl)-indenyl)zirconiumdichloride,
A-(2,5-dimethyl-4-azapentalene)(2-methyl-4-(4'-tris(trifluoromethyl)methyl-phenyl)-indenyl)zirconiumdichloride,
A-(2-methyl-4-thiapentalene)(2-methyl-4-(4'-tris(trifluoromethyl)methyl-phenyl)-indenyl)zirconiumdichloride,
A-(2-methyl-6-thiapentalene)(2-methyl-4-(4'-tris(trifluoromethyl)methyl-phenyl)-indenyl)zirconiumdichloride,
A-(2-methyl-4-azapentalene)(2-ethyl-4-(4'-tert-butyl-phenyl)-indenyl)-zirconiumdichloride,
A-(2-methyl-5-azapentalene)(2-n-butyl-4-(4'-tert-butyl-phenyl)-indenyl)-zirconiumdichloride,
A-(2-methyl-N-phenyl-6-azapentalene)(2-methyl-4-(4'-tert-butyl-phenyl)-indenyl)-zirconiumdichloride,
A-(2-methyl-4-azapentalene)(2-methylindenyl)zirconiumdichloride,
A-(2-methyl-N-phenyl-4-azapentalene)(2-methylindenyl)zirconiumdichloride,
A-(2-methyl-4-thiapentalene)(2-methylindenyl)zirconiumdichloride,
A-(2-methyl-5-thiapentalene)(2-methylindenyl)zirconiumdichloride,
A-(2-methyl-6-thiapentalene)(2-methylindenyl)zirconiumdichloride,
A-(2-methyl-4-azapentalene)(indenyl)zirconiumdichloride,
A-(2-methyl-5-azapentalene)(indenyl)zirconiumdichloride,
A-(2-methyl-6-azapentalene)(indenyl)zirconiumdichloride,
A-(2-methyl-N-phenyl-4-azapentalene)(indenyl)zirconiumdichloride,
A-(2-methyl-N-phenyl-5-azapentalene)(indenyl)zirconiumdichloride,
A-(2-methyl-N-phenyl-6-azapentalene)(indenyl)zirconiumdichloride,
A-(2,5-dimethyl-N-phenyl-6-azapentalene)(indenyl)zirconiumdichloride,
A-(2-methyl-4-thiapentalene)(indenyl)zirconiumdichloride,
A-(2-methyl-5-thiapentalene)(indenyl)zirconiumdichloride,
A-(2-methyl-6-thiapentalene)(indenyl)zirconiumdichloride,
A-(2,5-dimethyl-4-thiapentalene)(indenyl)zirconiumdichloride,
A-(2-methyl-4-azapentalene)(2-methyl-4-phenyl-indenyl)zirconiumdichloride,
A-(2-methyl-5-azapentalene)(2-methyl-4-phenyl-indenyl)zirconiumdichloride,
A-(2-methyl-6-azapentalene)(2-methyl-4-phenyl-indenyl)zirconiumdichloride,
A-(2-methyl-N-phenyl-4-azapentalene)(2-methyl-4-phenyl-indenyl)zirconiumdichloride,
A-(2-methyl-N-phenyl-5-azapentalene)(2-methyl-4-phenyl-indenyl)zirconiumdichloride,
A-(2-methyl-4-thiapentalene)(2-methyl-4-phenyl-indenyl)zirconiumdichloride,
A-(2-methyl-5-thiapentalene)(2-methyl-4-phenyl-indenyl)zirconiumdichloride,
A-(2-methyl-6-thiapentalene)(2-methyl-4-phenyl-indenyl)zirconiumdichloride,
A-(2-methyl-4-oxapentalene)(2-methyl-4-phenyl-indenyl)zirconiumdichloride,
A-(2-methyl-4-azapentalene)(2-methyl-4,5-benzo-indenyl)zirconiumdichloride,
A-(2-methyl-N-phenyl-4-azapentalene)(2-methyl-4,5-benzo-indenyl)zirconiumdichloride,
A-(2-methyl-N-phenyl-5-azapentalene)(2-methyl-4,5-benzo-indenyl)zirconiumdichloride,
A-(2-methyl-N-phenyl-6-azapentalene)(2-methyl-4,5-benzo-indenyl)zirconiumdichloride,
A-(2-methyl-4-thiapentalene)(2-methyl-4,5-benzo-indenyl)zirconiumdichloride,
A-(2-methyl-5-thiapentalene)(2-methyl-4,5-benzo-indenyl)zirconiumdichloride,
A-(2-methyl-6-thiapentalene)(2-methyl-4,5-benzo-indenyl)zirconiumdichloride,
A-(2-methyl-4-oxapentalene)(2-methyl-4,5-benzo-indenyl)zirconiumdichloride,
A-(2-methyl-5-oxapentalene)(2-methyl-4,5-benzo-indenyl)zirconiumdichloride,
A-(2-methyl-6-oxapentalene)(2-methyl-4,5-benzo-indenyl)zirconiumdichloride,
A-bis(2-methyl-4-azapentalene)zirconiumdichloride,
A-bis(2-methyl-N-phenyl-4-azapentalene)zirconiumdichloride,
A-bis(2-methyl-4-thiapentalene)zirconiumdichloride.

A is Dimethylsilanediyl, Diethylsilanediyl, Dipropylsilanediyl, Dibutylsilanediyl, Dipentylsilanediyl, Dihexylsilanediyl, Diheptylsilanediyl, Dioctylsilanediyl, Dinonanylsilanediyl, Didecanylsilanediyl, Diundecanylsilanediyl, Didodecanylsilanediyl, Dimethylgermanediyl, Diethylgermanediyl, Dipropylgermanediyl, Dibutylgermanediyl, Dipentylgermanediyl, Dihexylgermanediyl, Diheptylgermanediyl, Dioctylgermanediyl, Dinonanylgermanediyl, Didecanylgermanediyl, Diundecanylgermanediyl or Didodecanylgermanediyl, Hexyl(methyl)germanediyl, Ethyl(methyl)germanediyl, Ethyl(methyl)silanediyl, Propyl(methyl)silanediyl, 3,3,3-trifluoropropyl(methyl)silanediyl, Propyl(ethyl)silanediyl, Butyl(methyl)silanediyl, Butyl(ethyl)silanediyl, Butyl(propyl)silanediyl, Pentyl(methyl)silanediyl, Pentyl(ethyl)silanediyl, Pentyl(propyl)silanediyl, Pentyl(butyl)silanediyl, Hexyl(methyl)silanediyl, Hexyl(ethyl)silanediyl or Hexyl(propyl)silanediyl, Hexyl(butyl)silanediyl or Hexyl(pentyl)silanediyl, such that the list of bridge elements A is to be understood in such a way that the naming of the substituents on the bridge atom is meant also to include all structural isomers as though they were explicitly named. For example, dibutylsilanediyl simultaneously includes di(n-butyl)silanediyl, di(sec-butyl)silanediyl, di(tert-butyl)silanediyl, or mixtures of these structural isomers. Similarly, the naming of dipentylsilanediyl also includes, for example, di(cyclopentyl)silanediyl or the naming of hexyl(methyl)silanediyl also includes, for example, cyclohexyl(methyl)silanediyl.

Instead of the preferred pure chiral bridged racemic or pseudoracemic metallocene compounds of formulas 1a to 1d, mixtures of the metallocenes of formulas 1a to 1d and the corresponding meso or pseudomeso metallocenes may be used in the catalyst preparation. However, the isomerically pure racemic form is especially preferred for the use of metallocenes in the polymerization of olefins to isotactic polyolefins, since the corresponding meso form may produce undesired atactic PP. The isomerically pure racemic form is understood to mean a rac:meso ratio of at least 5:1, preferably 10:1 and most preferred 20:1.

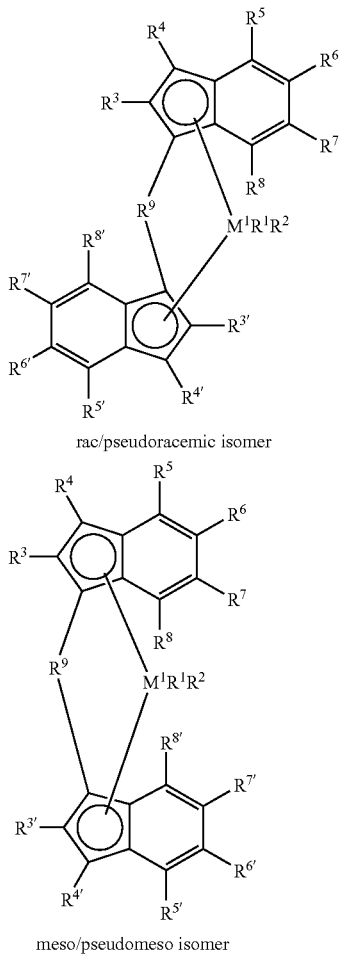

rac/pseudoracemic isomer meso/pseudomeso isomer

The synthesis of such complexes can be carried out by methods known per se, with preference being given to the reaction of the appropriately substituted, cyclic hydrocarbon anions with halides of titanium, zirconium or hafnium.

As a Lewis base B) use is made of compounds of the formula V, $$M^2R^{11}R^{12}R^{13} \quad (V)$$

where $M^2$ is an element of main group V of the Periodic Table of the Elements, (including, but not limited to, nitrogen and phosphorus), $R^{11}$, $R^{12}$ and $R^{13}$ are identical or different and are each a hydrogen atom, a $C_1$-$C_{20}$-alkyl group, a $C_1$-$C_{20}$-haloalkyl group or a $C_7$-$C_{40}$-arylalkyl group group, where two radicals or all three radicals $R^{11}$, $R^{12}$ and $R^{13}$ may be joined to one another via $C_2$-$C_{20}$ units, where at least one radical $R^{11}$, $R^{12}$ or $R^{13}$ is a $C_7$-$C_{40}$-arylalkyl group.

Preference is given to Lewis bases of the formula V in which $R^{11}$, $R^{12}$ and $R^{13}$ are identical or different and particular preference is given to Lewis bases of the formula V in which $R^{11}$, $R^{12}$, $R^{13}$ are identical or different and at least one of them is a benzylic group.

Examples of Lewis bases of the formula V are

N,N-diethylbenzylamine, N,N-dimethylbenzylamine, N-benzyldimethylamine, N-benzyldiethylamine, N-benzylbutylamine, N-benzyl tertbutylamine, N -benzylisopropylamine, N-benzylmethylamine, N-benzylethylamine, N-benzyl-1-phenylethylamine, N-benzyl-2-phenylethylamine, N,N-dimethylbenzylamine, N,N -diethylbenzylamine, N-methyl-N-ethylbenzylamine, N-methyldibenzylamine, N -ethyldi(benzyl)amine.

Examples of particularly preferred bases are benzylamine, N -benzyldimethylamine, N-benzyldiethylamine, N-benzylbutylamine, N-benzyl tert -butylamine, N-benzylisopropylamine, N-benzylmethylamine, N-benzylethylamine, N -benzyl-1-phenylethylamine or N-benzyl-2-phenylethylamine.

The support C) is a porous inorganic or organic inert solid. The support C) preferably comprises at least one inorganic oxide such as silicon oxide, aluminum oxide, aluminosilicates, zeolites, MgO, $ZrO_2$, $TiO_2$, $B_2O_3$, CaO, ZnO, $ThO_2$, $Na_2CO_3$, $K_2CO_3$, $CaCO_3$, $MgCl_2$, $Na_2SO_4$, $Al_2(SO_4)_3$, $BaSO_4$, $KNO_3$, $Mg(NO_3)_2$, $Al(NO_3)_3$, $Na_2O$, $K_2O$, $Li_2O$, or mixed oxides, in particular silicon oxide and/or aluminum oxide and/or Mg—Al mixed oxide. The support may also comprise at least one finely divided polymer powder, e.g. a homopolymer or copolymer, crosslinked polymer or a polymer blend. Examples of polymers are polyethylene, polypropylene, polybutene, polystyrene, divinylbenzene-crosslinked polystyrene, polyvinyl chloride, acrylonitrile -butadiene-styrene copolymer, polyamide, polymethacrylate, polycarbonate, polyester, polyacetal or polyvinyl alcohol.

The support C) has a specific surface area in the range from about 10 to about 1000 $m^2/g$, preferably from about 50 to about 500 $m^2/g$. The mean particle size of the support is from about 1 to about 500 μm, preferably from about 5 to about 350 μm, particularly preferably from about 10 to about 200 μm.

The support C) is preferably porous with a pore volume of from about 0.1 to about 5.0 ml/g, preferably from about 0.5 to about 3.5 ml/g. A porous support has a certain proportion of voids (pore volume). The shape of the pores is usually irregular, frequently spherical. The pores can be connected to one another by small pore openings. The pore diameter is preferably from about 2 to 50 nm. The particle shape of the porous support can be irregular or spherical. The particle size of the support can be set to any desired value, for example, by cryogenic milling and/or sieving.

The support materials can be thermally and/or chemically be pretreated in order to adjust certain properties of the carrier such as the water and/or the hydroxyl group content.

If the support material has a low moisture content or residual solvent content, dehydration or drying before use can be omitted. If this is not the case, as when using silica gel as support material, dehydration or drying is advisable. Thermal dehydration or drying of the support material can be carried out under reduced pressure with or without simultaneous inert gas blanketing (nitrogen). The drying temperature is in the range from about 80° C. to about 1000° C., preferably from about 150° C. to about 800° C. and most preferred from about 150° C. to about 200° C. The duration of the drying process can be from 1 to 24 hours. But shorter or longer drying periods are also possible.

In a preferred embodiment of the present invention, support materials with a weight loss on dryness (LOD) of 1 wt. % or less, and even more preferred with a LOD of about 0.5 wt % or less are used. Higher amounts of physically adsorbed water up to about 2 wt % are possible, but result in reduced catalyst activities. The loss on ignition (LOI) of the support material is preferably about 1 wt % or greater or even more preferred between about 1.5 and 3.5 wt %. The weight loss on dryness (LOD) is thereby defined as the weight loss between room temperature and about 300° C. and the weight loss on ignition (LOI) as the weight loss between about 300° C. and 1000° C.

In addition or alternatively, dehydration or drying of the support material can also be carried out by chemical means, by reacting the adsorbed water and/or the surface hydroxyl groups with suitable passivating agents. Reaction with the passivating reagent can convert the hydroxyl groups completely or partially into a form, which does not show any adverse interaction with the catalytically active centers. Suitable passivating agents are silicon halides, silanes or amines, eg. silicon tetrachloride, chlorotrimethylsilane, dichlorodialkylsilanes, dimethylaminotrichlorosilane, N,N-dimethylaniline or N,N-dimethylbenzylamine or organometallic compounds of aluminum, boron and magnesium, eg. aluminoxanes, trimethylaluminum, triethylaluminum, triisobutylaluminum, triethylborane or dibutylmagnesium.

As outlined above, organic support materials such as finely divided polymer powders, can also be used and should, before use, likewise be freed from any adhering moisture, solvent residues or other impurities by means of appropriate purification and drying operations.

Preference is given to using silica gels having the defined parameters as support materials.

Compounds having at least one functional group containing active hydrogen like hydroxyl groups, mercapto groups, primary and secondary amino groups, silanol groups, carboxyl groups, amido groups and imino groups are used as component D) in the catalyst preparation. Preferred functional groups are hydroxyl groups.

Preferred compounds D) are, in particular those of the formula (VI)

where

G is an atom of group III (e.g., Al, Ga, In, Tl), IV (e.g., C, Si, Ge, Sn, Pb) or V (e.g., N, P, As, Sb, Bi) of the Periodic Table or a group comprising from 2 to 20 carbon atoms, preferably an atom of main group III of the Periodic Table, in particular boron or aluminum, or a partially halogenated or perhalogenated $C_1$-$C_{20}$-alkyl or $C_6$-$C_{40}$-aryl group and is particularly preferably an atom of main group III of the Periodic Table, preferably boron or aluminum and in particular boron, $R^{14}$ are identical or different and are each, independently of one another, hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$ haloalkylaryl or $R^{14}$ is an $OSiR^{15}_3$ group, where $R^{15}$ are identical or different and are each hydrogen, halogen, $C_1$-$C_{20}$-alkyl, $C_1$-$C_{20}$-haloalkyl, $C_1$-$C_{10}$-alkoxy, $C_6$-$C_{20}$-aryl, $C_6$-$C_{20}$-haloaryl, $C_6$-$C_{20}$-aryloxy, $C_7$-$C_{40}$-arylalkyl, $C_7$-$C_{40}$-haloarylalkyl, $C_7$-$C_{40}$-alkylaryl or $C_7$-$C_{40}$-haloalkylaryl, and $R^{14}$ is preferably hydrogen, halogen, $C_6$-$C_{14}$-aryl, $C_6$-$C_{14}$-haloaryl, $C_1$-$C_{14}$-alkyl, $C_1$-$C_{14}$-haloalkyl, $C_7$-$C_{30}$-arylalkyl, $C_7$-$C_{30}$-haloarylalkyl, $C_7$-$C_{30}$-alkylaryl or $C_7$-$C_{30}$-haloalkylaryl and is particularly preferably $C_6$-$C_{10}$-aryl, $C_6$-$C_{10}$-haloaryl, $C_1$-$C_6$-alkyl, $C_1$-$C_6$-haloalkyl, $C_7$-$C_{20}$-alkylaryl or $C_7$-$C_{20}$-haloalkylaryl, r is at least 1 and is preferably from 1 to 5, in particular 1 or 2 and very particularly preferably 1, and s is an integer from 0 to 30, with particular preference being given to s being 2 when r is 1 or being 1 when r is 2.

Preferred organic compounds of the formula (VI) containing hydroxyl groups include compounds having partially fluorinated or perfluorinated aryl groups, e.g. pentafluorophenol or nonafluorobiphenyl-1-ol or dihydroxyoctafluorobiphenyl. Such compounds D) can also be used in the form of an adduct with from 1 to 10 parts of water, in particular when containing two hydroxyl groups.

Particular preferred compounds of the formula (VI) are borinic acids of the formula $R^{14}_2B(OH)$ and/or boronic acids of the formula $R^{14}B(OH)_2$, especially Bis(pentafluorophenyl)borinic acid and pentafluorophenylboronic acid.

The component E) used in the preparation of the catalyst is at least one organometallic compound of the formula VII,

wherein $M^5$ is an alkali metal (eg., Li, Na, K, Rb, Cs), an alkaline earth metal (e.g., Be, Mg, Ca, Sr, Ba) or a metal of group III (e.g., B, Al, Ga, In, Tl) of the Periodic Table of the Elements, $R^{22}$ is a hydrogen atom, alkyl of from 1 to about 10 carbon atoms, aryl of from 6 to about 15 carbon atoms, or alkylaryl or arylalkyl each having from 1 to about 10 carbon atoms in the alkyl part and from 6 to about 20 carbon atoms in the aryl part, $R^{23}$ and $R^{24}$ are each a hydrogen atom, a halogen atom, alkyl of from 1 to about 10 carbon atoms, aryl of from about 6 to about 15 carbon atoms, or alkylaryl, arylalkyl or alkoxy each having from 1 to 10 carbon atoms in the alkyl part and from 6 to about 20 carbon atoms in the aryl radical, t is an integer from 1 to 3 and u and v are integers from 0 to 2, where the sum t+u+v corresponds to the valence of $M^5$, where this component is not identical with the above mentioned cocatalytically active compounds. It is also possible to use mixtures of various metal compounds of the formula VII.

Among the metal compounds of the formula VII preference is given to those in which $M^5$ is lithium, magnesium or aluminum and $R^{23}$ and $R^{24}$ are each alkyl of from 1 to about 10 carbon atoms.

Particularly preferred metal compounds of the formula VII are n-butyllithium, n-butyl-n-octyl-magnesium, n-butyl-n-heptylmagnesium, trimethylaluminum, triethylaluminum, triisopropylaluminum, trihexylaluminum, trioctylaluminum, tri-n-butylaluminum, triisobutylaluminum,tri-n-propylaluminum, triisoprenylaluminum, dimethylaluminum monochloride, diethylaluminum monochloride, diisobutylaluminum monochloride, methylaluminum sesquichloride, ethylaluminum sesquichloride, dimethylaluminum hydride, diethylaluminum hydride, diisopropylaluminum hydride, dimethylaluminum trimethylsiloxide, dimethylaluminum triethylsiloxide, phenylalane, pentafluorophenylalane and o-tolylalane.

It is also possible to use mixtures of various metal compounds of the formula (VII).

The catalyst system of the present invention is obtainable by reacting at least one Lewis base B) and at least one organic compound having at least one functional group containing active hydrogen D) and at least one organometallic compound E) with a support C). The product is subsequently reacted with a solution or suspension of one or more metallocene A) and, if desired, one or more organometallic compounds E).

To prepare the catalyst system of the present invention, the support material is suspended in a suitable organic solvent. The support can be pretreated beforehand with a compound of the formula (VII). One or more Lewis-bases of the formula (V) is/are subsequently added to the suspension, with the reaction time being able to be from one minute to 48 hours, preferably from 10 minutes to 2 hours. The reaction product (referred to as activated support) can be isolated and subsequently resuspended or else can be reacted directly with at least one of the cocatalytically active compounds. Preference is given to using from 0.1 to 4 equivalents of a Lewis base of the formula V per equivalent of the cocatalytically active compound. Particular preference is given to using from 0.5 to 1 equivalent of a Lewis base of the formula V per equivalent of the cocatalytically active compound. The cocatalytically active compounds are prepared separately by dissolving an organometallic compound of formula VII in a suitable organic solvent and subsequently adding at least one compound of formula VI either in solution or as a pure substance. The reaction time here is being able to vary from one minute to 48 h, preferably from 10 minutes to 3 hours. The stoichiometric ratio of an organic compound of formula VI and the organometallic compound of formula VII is from about 3:1 to 5:1, preference is given to a ratio of about 3:1 to 4:1; particular preference is given to a ratio of 3:1 between a compound of formula VI and formula VII.

The cocatalytically active reaction product can be isolated or used directly in solution for the reaction with the activated support. The reaction time here is from one minute to 48 hours, preferably from 10 minutes to 2 hours. The reaction product of this reaction is a compound which is capable of forming metallocene ions and is covalently bound to the support material. This is herein after referred to as the modified support material. The reaction mixture is subsequently filtered and the solid is washed with a suitable solvent. The modified support material is then dried in a high vacuum. The modified support material can be resuspended after drying and be after-treated with a compound of the formula VII. However, the compound of the formula VII can also be added before filtration and drying of the modified support material.

The application of one or more metallocenes A), preferably of the formula 1a-1d, and, if desired, one or more organometallic compounds of the formula VII to the modified support material is preferably carried out by dissolving or suspending one or more metallocenes A) in one suitable solvent and subsequently reacting it with one or more compounds of the formula (VII) which is/are preferably likewise in dissolved or suspended form. The stoichiometric ratio of metallocenes A) to the organometallic compound of the formula (VII) is from 100:1 to $10^{-4}$:1. The ratio is preferably from 1:1 to $10^{-2}$:1. The modified support material can either be placed directly in the polymerization reactor or in a reaction flask in one suitable solvent. This is followed by the addition of the mixture of a metallocene A) and an organometallic compound of the formula (VII). However, if desired, one or more metallocenes A) can also be added to the modified support material without prior addition of an organometallic compound of the formula (VI).

The ratio of the modified support to the metallocene A) is preferably from 10 g:1 µmol to $10^{-2}$ g:1 µmol. The stoichiometric ratio of the metallocene A) to units of the cocatalytically active compound is from 100:1 to $10^4$:1, preferably from 1:1 to $10^{-2}$:1.

The resultant catalyst system can be isolated by removing the major part of the solvent from the resulting mixture, optionally washing the catalyst system with a suitable solvent, and/or drying the catalyst system at temperatures of 30 to 60° C., and optionally prepolymerizing the resulting catalyst with one or more olefinic monomer(s) to obtain a prepolymerized catalyst system.

All of the above-described reactions for preparing the catalyst system of the present invention are carried out at from about −40 to about 110° C., preferably at from about −10° C. to about 80° C. particularly preferably at from about 10° C. to about 80° C. Suitable solvents for all of the above described reactions are aromatic or aliphatic solvents, for example hexane, heptane, toluene or xylene, or halogenated hydrocarbons such as ethylene chloride or halogenated aromatic hydrocarbons such as o-dichlorobenzene.

The present invention also provides a process for preparing a polyolefin by polymerization of one or more olefins in the presence of the catalyst system of the present invention comprising at least one metallocene A). For the purposes of the present invention, the term polymerization refers to both homopolymerization and copolymerization and the term copolymerization includes terpolymerisation or copolymerisation of more than three different monomers.

Preference is given to polymerizing olefins of the formula $R'''$—CH=CH—$R''$, where $R'''$ and $R''$ are identical or different and are each a hydrogen atom or a radical having from 1 to 20 carbon atoms, in particular from 1 to 10 carbon atoms, and $R'''$ and $R''$ together with the atoms connecting them can form one or more rings.

Suitable olefins are 1-olefins, e.g. ethene, propene, 1-butene, 1-pentene, 1-hexene, 4-methyl-1-pentene or 1-octene, styrene, dienes such as 1,3-butadiene, 1,4-hexadiene, vinylnorbornene, norbornadiene, ethylnorbornadiene and cyclic olefins such as norbornene, tetracyclododecene or methylnorbornene. In the process of the present invention, preference is given to homopolymerizing propene or ethene or copolymerizing propene with ethene and/or one or more 1-olefins having from 4 to 20 carbon atoms, eg. 1-butene or hexene, and/or one or more dienes having from 4 to 20 carbon atoms, eg. 1,4-butadiene, norbornadiene, ethylidenenorbornene or ethylnorbornadiene. Very suitable copolymers are ethene-propene copolymers, propene-1-pentene copolymers and ethene-propene-1-butene, ethene-propene-1-pentene or ethene-propene-1,4-hexadiene terpolymers.

The polymerization is carried out at from about −60° C. to about 300° C., preferably from about 50° C. to about 200° C., very particularly preferably from 50° C. to about 95° C. The pressure is from 0.5 to 2000 bar, preferably from about 5 to 100 bar.

The polymerization can be carried out in solution, in bulk, in suspension or in the gas phase, continuously or batchwise, in one or more stages. As an example, impact copolymers are preferably produced in more than one stage. The homopolymer or random copolymer content of such a polymer can be produced in (a) first stage(s) and the copolymer rubber content can be produced in (a) consecutive stage(s).

The supported catalyst system prepared according to the present invention can be used as sole catalyst component for the polymerization of olefins or preferably in combination with at least one alkyl compound of elements of main Groups I to III of the Periodic Table, for example an aluminum alkyl, magnesium alkyl or lithium alkyl or an aluminoxane. The alkyl compound is added to the monomer or suspension medium and serves to free the monomer of substances, which can impair the catalytic activity. The amount of alkyl compound added depends on the quality of the monomers used.

To prepare olefin polymers having a broad or bimodal molecular weight distribution or a broad or bimodal melting range, it is recommended to use a catalyst system comprising two or more different organic transition metal compounds A) and/or two or more different cocatalysts. Alternatively two or more different catalyst systems of the present invention can be used as a mixture.

As molar mass regulator and/or to increase the activity, hydrogen is added if required.

The catalyst system may be supplied to the polymerization system as a solid or in the form of a suspension in a hydrocarbon or may be treated with inert components, such as paraffins, oils, or waxes, to achieve better metering. If the catalyst system is to be metered into the reactor together with the monomer to be polymerized or the monomer mixture to be polymerized, the mixing unit and the metering line are preferably cooled.

Furthermore, an additive such as an antistatic or an alcohol can be used in the process of the present invention, for example to improve the particle morphology of the olefin polymer. In general it is possible to use all antistatics which are suitable in olefin polymerization processes. It is preferred to dose the antistatic directly into the polymerization system, either together with or separately from the catalyst system used.

The polymers prepared using the catalyst systems of the present invention display a uniform particle morphology and contain no fines. No agglomerates or deposits are obtained in the polymerization using the catalyst system of the present invention.

The catalyst systems of the present invention give polymers such as polypropylene ("PP") having high molecular weight and cover a broad range of stereospecificity and regiospecificity and the productivity of the catalyst system used is very high.

The polymers prepared by the process of the present invention are suitable, in particular, for producing products such as fibers, filaments, injection-molded parts, films, sheets, caps, closures, bottles or large hollow bodies such as pipes with excellent properties.

EXAMPLES

General Procedures

The preparation and handling of the organometallic compounds were carried out under argon using Schlenk techniques or in a glove box. All solvents were purged with argon and dried over molecular sieves before use. The polymers produced and the metallocenes used were characterized by $^1$H-NMR, $^{13}$C-NMR, DSC, GPC and IR spectroscopy.

Room temperature: 20° C.

Example 1

Preparation of Catalyst System 1 a) Preparation of Tris(bis(pentafluorophenylboroxy))alane 1 mL of trimethylaluminium solution (2.1 M in Exxol) is introduced into 13 mL of toluene at room temperature, 2.17 g (6.0 mmoles) of bis(pentafluorophenyl)borinic acid are added. After the addition the suspension is heated at 60° C. for 90 minutes.

b) Preparation of Supported Tris(bis(pentafluorophenylboroxy))alane 1.5 g of $SiO_2$ (Grace XPO 2107, dried at 180° C. and 1 mbar for 16 h) are suspended in 15 mL of toluene. 225 µL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 3.1 g of the support material are obtained.

c) Preparation of Catalyst System 1

71.2 mg (0.124 mmole) of dimethylsilanediylbis(2-methyl-4,5-benzindenyl)-zirconium dichloride are dissolved in 26 mL of toluene and 590 µL of a trimethylaluminium solution (2.1 M in toluene) are added dropwise at room temperature. The suspension is stirred for one hour at 50° C. This solution is added dropwise to a suspension of 2.9 g of the support material prepared in (b) in 15 mL of toluene. The suspension is stirred for one hour at room temperature, and the solvent is removed in a vacuum. About 3.1-3.3 g of a free-flowing powder are obtained.

Example 2

Polymerization Procedure A with Catalyst System 1

A dry 1.8 dm$^3$ autoclave is purged with nitrogen and subsequently with propylene and charged with 1500 cm$^3$ of liquid propylene. 2 cm$^3$ of triisobutylaluminum (20 wt.-% solution in heptane) are added and the mixture is stirred for 15 minutes at 30° C.

For the polymerizations 0.002 mmol of the respective metallocene compounds, supported according to Example 1, are used. The corresponding amount of the catalyst powder is suspended in 20 cm$^3$ of heptane and is injected with 15 cm$^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 380 g of polymer are obtained corresponding to an activity of 330 kg PP/(g metallocene×h). The polymer produced was a free flowing powder of spherical polymer particles with a narrow particle size distribution and a bulk density>430 g/dm$^3$.

Comparison Example 3

Preparation of Catalyst System 2 a) Preparation of Bis(pentafluorophenylboroxy)methylalane 1 mL of trimethylaluminium solution (2.1 M in Exxol) is introduced into 13 mL of toluene at room temperature, 1.45 g (4.0 mmoles) of bis(pentafluorophenyl)borinic acid are added. After the addition the suspension is heated at 60° C. for 90 minutes.

b) Preparation of Supported Bis(pentafluorophenylboroxy)methylalane 1.5 g of $SiO_2$ (Grace XPO 2107, dried at 180° C. and 1 mbar for 16 h) are suspended in 15 mL of toluene. 225 µL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 2.5 g of the support material are obtained.

c) Preparation of Catalyst System 2

60.0 mg (0.104 mmole) of dimethylsilanediylbis(2-methyl-4,5-benzindenyl) -zirconium dichloride are dissolved are dissolved in 22 mL of toluene and 495 μL of a trimethylaluminium solution (2.1 M in toluene) are added dropwise at room temperature. The suspension is stirred for one hour at 50° C. This solution is added dropwise to a suspension of 2.3 g of the support material prepared in (b) in 12 mL of toluene. The suspension is stirred for one hour at room temperature, and the solvent is removed in a vacuum. About 2.3-2.5 g of a free-flowing powder are obtained.

Comparison Example 4.1

Polymerization Procedure A with Catalyst System 2

A dry 1.8 dm$^3$ autoclave is purged with nitrogen and subsequently with propylene and charged with 1500 cm$^3$ of liquid propylene. 2 cm$^3$ of triisobutylaluminum (20 wt.- % solution in heptane) are added and the mixture is stirred for 15 minutes at 30° C.

For the polymerizations 0.006 mmol of the respective metallocene compounds, supported according to Comparison Example 3, are used. The corresponding amount of the catalyst powder is suspended in 20 cm$^3$ of heptane and is injected with 15 cm$^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 505 g of polymer are obtained corresponding to an activity of 146 kg PP/(g metallocene×h).

Comparison Example 4.2

Polymerization Procedure A with Catalyst System 2

A dry 1.8 dm$^3$ autoclave is purged with nitrogen and subsequently with propylene and charged with 1500 cm$^3$ of liquid propylene. 2 cm$^3$ of triisobutylaluminum (20 wt. % solution in heptane) are added and the mixture is stirred for 15 minutes at 30° C.

For the polymerizations 0.002 mmol of the respective metallocene compounds, supported according to Comparison Example 3, are used. The corresponding amount of the catalyst powder is suspended in 20 cm$^3$ of heptane and is injected with 15 cm$^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 155 g of polymer are obtained corresponding to an activity of 135 kg PP/(g metallocene×h).

Comparison Example 5

Preparation of Catalyst System 3

18.5 mg (0.032 mmol) of dimethylsilanediylbis(2-methyl-4,5-benzindenyl) -zirconium dichloride are dissolved in 10 ml toluene at room temperature. To this solution 1.5 ml of a methylaluminoxane solution (30% in toluene) are added. The solution is stirred for one hour at room temperature. This solution is added to a suspension of 1.5 g of SiO$_2$ (Grace XPO 2107, dried at 180° C. and 1 mbar for 16 h) in 10 ml of toluene. The corresponding suspension is stirred at room temperature for 15 minutes and the solvent is removed in vacuum. About 1.8 to 2.1 g of a free-flowing powder are obtained.

Comparison Example 6

Polymerisation with Catalyst System 3

A dry 1.8 dm$^3$ autoclave is purged with nitrogen and subsequently with propylene and charged with 1500 cm$^3$ of liquid propylene. 2 cm$^3$ of triisobutylaluminum (20 wt.- % solution in heptane) are added and the mixture is stirred for 15 minutes at 30° C.

For the polymerizations 0.006 mmol of the respective metallocene compounds, supported according to Comparison Example 5 are used. The corresponding amount of the catalyst powder is suspended in 20 cm$^3$ of heptane and is injected with 15 cm$^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 149 g of polymer are obtained corresponding to an activity of 43 kg PP/(g metallocene×h).

Example 7

Preparation of Catalyst System 4 a) Preparation of Tris(bis(pentafluorophenylboroxy)) alane 1 mL of trimethylaluminium solution (2.1 M in Exxol) is introduced into 13 mL of toluene at room temperature, 2.17 g (6.0 mmoles) of bis(pentafluorophenyl)borinic acid are added. After the addition the suspension is heated at 60° C. for 90 minutes.

b) Preparation of Supported Tris(bis(pentafluorophenylboroxy))alane 1.5 g of SiO$_2$ (Grace XPO 2107, dried at 180° C. and 1 mbar for 16 h) are suspended in 15 mL of toluene. 225 μL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and is dried in a vacuum. 3.0 g of the support material are obtained.

c) Preparation of Catalyst System 4

83.3 mg (0.112 mmole) of dimethylsilanediylbis(2-methyl-4-(4'-tert-butyl -phenyl-indenyl)zirconium dichloride are dissolved in 30 mL of toluene and 534 μL of a trimethylaluminium solution (2.1 M in toluene) are added dropwise at room temperature. The suspension is stirred for one hour at 50° C. This solution is added dropwise to a suspension of 2.8 g of the support material prepared in (b) in 15 mL of toluene. The suspension is stirred for one hour at room temperature, and the solvent is removed in a vacuum. About 3.0-3.2 g of a free-flowing powder are obtained.

Example 8

Polymerisation with Catalyst System 4

A dry 1.8 dm$^3$ autoclave is purged with nitrogen and subsequently with propylene and charged with 1500 cm$^3$ of liquid propylene. 2 cm³ of triisobutylaluminum (20 wt.-% solution in heptane) are added and the mixture is stirred for 15 minutes at 30° C.

For the polymerizations 0.004 mmol of the respective metallocene compounds, supported according to example 7, are used. The corresponding amount of the catalyst powder is suspended in 20 cm³ of heptane and is injected with 15 cm³ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 447 g of polymer are obtained corresponding to an activity of 151 kg PP/(g metallocene×h).

Comparison Example 9

Preparation of Catalyst System 5 a) Preparation of Bis(pentafluorophenylboroxy)methylalane 1 mL of trimethylaluminium solution (2.1 M in Exxol) is introduced into 13 mL of toluene at room temperature, 1.45 g (4.0 mmoles) of bis(pentafluorophenyl)borinic acid are added. After the addition the suspension is heated at 60° C. for 90 minutes.

b) Preparation of Supported Bis(pentafluorophenylboroxy)methylalane 1.5 g of SiO₂ (Grace XPO 2107, dried at 180° C. and 1 mbar for 16 h) are suspended in 15 mL of toluene. 225 μL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 2.6 g of the support material are obtained.

c) Preparation of Catalyst System 5

80.2 mg (0.108 mmole) of dimethylsilanediylbis(2-methyl-4-(4'-tert-butyl-phenyl-indenyl)zirconium dichloride are dissolved are dissolved in 29 mL of toluene and 514 μL of a trimethylaluminium solution (2.1 M in toluene) are added dropwise at room temperature. The suspension is stirred for one hour at 50° C. This solution is added dropwise to a suspension of 2.3 g of the support material prepared in (b) in 12 mL of toluene. The suspension is stirred for one hour at room temperature, and the solvent is removed in a vacuum. About 2.3-2.5 g of a free-flowing powder are obtained.

Comparison Example 10

Polymerization Procedure A with Catalyst System 5

A dry 1.8 dm³ autoclave is purged with nitrogen and subsequently with propylene and charged with 1500 cm³ of liquid propylene. 2 cm³ of triisobutylaluminum (20 wt.-% solution in heptane) are added and the mixture is stirred for 15 minutes at 30° C.

For the polymerizations 0.006 mmol of the respective metallocene compounds, supported according to Comparison Example 9, are used. The corresponding amount of the catalyst powder is suspended in 20 cm³ of heptane and is injected with 15 cm³ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 160 g of polymer are obtained corresponding to an activity of 36 kg PP/(g metallocene×h)).

Comparison Example 11

Preparation of Catalyst System 6

23.7 mg (0.032 mmol) of dimethylsilanediylbis(2-methyl-4-(4'-tert-butyl-phenyl-indenyl)zirconium dichloride are dissolved in 10 ml toluene at room temperature. To this solution 1.5 ml of a methylaluminoxane solution (30% in toluene) are added. The solution is stirred for one hour at room temperature. This solution is added to a suspension of 1.5 g of SiO₂ (Grace XPO 2107, dried at 180° C. and 1 mbar for 16 h) in 10 ml of toluene. The corresponding suspension is stirred at room temperature for 15 minutes and the solvent is removed in vacuum. About 1.8 to 2.1 g of a free-flowing powder are obtained.

Comparison Example 12

Polymerisation with Catalyst System 6

A dry 1.8 dm³ autoclave is purged with nitrogen and subsequently with propylene and charged with 1500 cm³ of liquid propylene. 2 cm³ of triisobutylaluminum (20 wt.-% solution in heptane) are added and the mixture is stirred for 15 minutes at 30° C.

For the polymerizations 0.006 mmol of the respective metallocene compounds, supported according to Comparison Example 11 are used. The corresponding amount of the catalyst powder is suspended in 20 cm³ of heptane and is injected with 15 cm³ of heptane. The reaction mixture is heated to the polymerization temperature of 65° C.

and polymerization is allowed to proceed at 65° C. for 60 minutes. The polymerization is stopped by releasing the liquid monomer and cooling down the reactor. The produced polymer is dried under reduced pressure at 80° C. and 196 g of polymer are obtained corresponding to an activity of 44 kg PP/(g catalyst×h).

Example 13

Preparation of Catalyst System 7 a) Preparation of Tris(bis(pentafluorophenylboroxy))alane 1 mL of trimethylaluminium solution (2.1 M in Exxol) is introduced into 13 mL of toluene at room temperature, 2.17 g (6.0 mmoles) of bis(pentafluorophenyl)borinic acid are added. After the addition the suspension is heated at 60° C. for 90 minutes.

b) Preparation of Supported Tris(bis(pentafluorophenylboroxy))alane 1.5 g of SiO₂ (Grace XPO 2107, dried at 180° C. and 1 mbar for 16 h) are suspended in 15 mL of toluene. 225 μL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 3.1 g of the support material are obtained.

c) Preparation of Catalyst System 7

100.6 mg (0.124 mmole) of Cyclohexyl(methyl)silanediylbis(2-methyl-4-(4'-tert-butyl-phenyl)indenyl)zirconium dichloride are dissolved in 36 mL of toluene and 590 µL of a trimethylaluminium solution (2.1 M in toluene) are added dropwise at room temperature. The suspension is stirred for one hour at 50° C. This solution is added dropwise to a suspension of 3.0 g of the support material prepared in (b) in 15 mL of toluene. The suspension is stirred for one hour at room temperature, and the solvent is removed in a vacuum. About 3.1-3.3 g of a free-flowing powder are obtained.

Example 14

Polymerization Procedure A with Catalyst System 7

A dry 1.8 dm$^3$ autoclave is purged with nitrogen and subsequently with propylene and charged with 1500 cm$^3$ of liquid propylene. 2 cm$^3$ of triisobutylaluminum (20 wt.-% solution in heptane) are added and the mixture is stirred for 15 minutes at 30° C.

For the polymerizations 0.002 mmol of the respective metallocene compounds, supported according to example 13, are used. The corresponding amount of the catalyst powder is suspended in 20 cm$^3$ of heptane and is injected with 15 cm$^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 502 g of polymer are obtained corresponding to an activity of 310 kg PP/(g metallocene×h)).

Comparison Example 15

Preparation of Catalyst System 8 a) Preparation of Bis(pentafluorophenylboroxy)methylalane 1 mL of trimethylaluminium solution (2.1 M in Exxol) is introduced into 13 mL of toluene at room temperature, 1.45 g (4.0 mmoles) of bis(pentafluorophenyl)borinic acid are added. After the addition the suspension is heated at 60° C. for 90 minutes.

b) Preparation of Supported Bis(pentafluorophenylboroxy)methylalane 1.5 g of SiO$_2$ (Grace XPO 2107, dried at 180° C. and 1 mbar for 16 h) are suspended in 15 mL of toluene. 225 µL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 2.6 g of the support material are obtained.

c) Preparation of Catalyst System 8

95.2 mg (0.118 mmole) of Cyclohexyl(methyl)silanediylbis(2-methyl-4-(4'-tert-butyl-phenyl)indenyl)zirconium dichloride are dissolved in 34 mL of toluene and 562 µL of a trimethylaluminium solution (2 M in toluene) are added dropwise at room temperature. The suspension is stirred for one hour at 50° C. This solution is added dropwise to a suspension of 2.5 g of the support material prepared in (b) in 12 mL of toluene. The suspension is stirred for one hour at room temperature, and the solvent is removed in a vacuum. About 2.5-2.7 g of a free-flowing powder are obtained.

Comparison Example 16

Polymerization Procedure A with Catalyst System 8

A dry 1.8 dm$^3$ autoclave is purged with nitrogen and subsequently with propylene and charged with 1500 cm$^3$ of liquid propylene. 2 cm$^3$ of triisobutylaluminum (20 wt.-% solution in heptane) are added and the mixture is stirred for 15 minutes at 30° C.

For the polymerizations 0.004 mmol of the respective metallocene compounds, supported according to Comparison Example 15, are used. The corresponding amount of the catalyst powder is suspended in 20 cm$^3$ of heptane and is injected with 15 cm$^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 401 g of polymer are obtained corresponding to an activity of 124 kg PP/(g metallocene×h).

Comparison Example 17

Preparation of Catalyst System 9

25.9 mg (0.032 mmol) of Cyclohexyl(methyl)silanediylbis(2-methyl-4-(4'-tert-butyl-phenyl)indenyl)zirconium dichloride are dissolved in 10 ml toluene at room temperature. To this solution 1.5 ml of a methylaluminoxane solution (30% in toluene) are added. The solution is stirred for one hour at room temperature. This solution is added to a suspension of 1.5 g of SiO$_2$ (Grace XPO 2107, dried at 180° C. and 1 mbar for 16 h) in 10 ml of toluene. The corresponding suspension is stirred at room temperature for 15 minutes and the solvent is removed in vacuum. About 1.8 to 2.1 g of a free-flowing powder are obtained.

Comparison Example 18

Polymerisation with Catalyst System 9

A dry 1.8 dm$^3$ autoclave is purged with nitrogen and subsequently with propylene and charged with 1500 cm$^3$ of liquid propylene. 2 cm$^3$ of triisobutylaluminum (20 wt.-% solution in heptane) are added and the mixture is stirred for 15 minutes at 30° C.

For the polymerizations 0.006 mmol of the respective metallocene compounds, supported according to Comparison Example 17 are used. The corresponding amount of the catalyst powder is suspended in 20 cm$^3$ of heptane and is injected with 15 cm$^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 256 g of polymer are obtained corresponding to an activity of 53 kg PP/(g metallocene×h).

Example 19

Preparation of Catalyst System 10 a) Preparation of Tris(bis(pentafluorophenylboroxy))alane 1 mL of trimethylaluminium solution (2.1 M in Exxol) is introduced into 13 mL of toluene at room temperature, 2.17 g (6.0 mmoles) of bis(pentafluorophenyl)borinic acid are added. After the addition the suspension is heated at 60° C. for 90 minutes.

b) Preparation of Supported Tris(bis(pentafluorophenylboroxy))alane 1.5 g of $SiO_2$ (Grace XPO 2107, dried at 180° C. and 1 mbar for 16 h) are suspended in 15 mL of toluene. 225 µL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 3.1 g of the support material are obtained.

c) Preparation of Catalyst System 10

95.7 mg (0.124 mmole) of Dimethylsilanediyl(2-isopropyl-4-(4'-tert-butylphenyl)-1-indenyl)(2-methyl-4-(4'-tert-butylphenyl)-1-indenyl)zirconium dichloride are dissolved in 35 mL of toluene and 590 µL of a trimethylaluminium solution (2.1 M in toluene) are added dropwise at room temperature. The suspension is stirred for one hour at 50° C. This solution is added dropwise to a suspension of 3.0 g of the support material prepared in (b) in 15 mL of toluene. The suspension is stirred for one hour at room temperature, and the solvent is removed in a vacuum. About 3.1-3.3 g of a free-flowing powder are obtained.

Example 20

Polymerization Procedure A with Catalyst System 10

A dry 1.8 $dm^3$ autoclave is purged with nitrogen and subsequently with propylene and charged with 1500 $cm^3$ of liquid propylene. 2 $cm^3$ of triisobutylaluminum (20 wt.-% solution in heptane) are added and the mixture is stirred for 15 minutes at 30° C.

For the polymerizations 0.002 mmol of the respective metallocene compounds, supported according to example 19, are used. The corresponding amount of the catalyst powder is suspended in 20 $cm^3$ of heptane and is injected with 15 $cm^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 338 g of polymer are obtained corresponding to an activity of 220 kg PP/(g metallocenexh)).

Comparison Example 21

Preparation of Catalyst System 11 a) Preparation of Bis(pentafluorophenylboroxy)methylalane 1 mL of trimethylaluminium solution (2.1 M in Exxol) is introduced into 13 mL of toluene at room temperature, 1.45 g (4.0 mmoles) of bis(pentafluorophenyl)borinic acid are added. After the addition the suspension is heated at 60° C. for 90 minutes.

b) Preparation of Supported Bis(pentafluorophenylboroxy)methylalane 1.5 g of $SiO_2$ (Grace XPO 2107, dried at 180° C. and 1 mbar for 16 h) are suspended in 15 mL of toluene. 225 µL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 2.6 g of the support material are obtained.

c) Preparation of Catalyst System 11

86.9 mg (0.113 mmole) of dimethylsilanediyl(2-isopropyl-4-(4'-tert-butylphenyl)-1-indenyl)(2-methyl-4-(4'-tert-butylphenyl)-1-indenyl)zirconium dichloride are dissolved are dissolved in 31 mL of toluene and 538 µL of a trimethylaluminium solution (2.1 M in toluene) are added dropwise at room temperature. The suspension is stirred for one hour at 50° C. This solution is added dropwise to a suspension of 2.4 g of the support material prepared in (b) in 12 mL of toluene. The suspension is stirred for one hour at room temperature, and the solvent is removed in a vacuum. About 2.4-2.6 g of a free-flowing powder are obtained.

Comparison Example 22

Polymerization Procedure A with Catalyst System 11

A dry 1.8 $dm^3$ autoclave is purged with nitrogen and subsequently with propylene and charged with 1500 $cm^3$ of liquid propylene. 2 $cm^3$ of triisobutylaluminum (20 wt.-% solution in heptane) are added and the mixture is stirred for 15 minutes at 30° C.

For the polymerizations 0.006 mmol of the respective metallocene compounds, supported according to Comparison Example 21, are used. The corresponding amount of the catalyst powder is suspended in 20 $cm^3$ of heptane and is injected with 15 $cm^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 461 g of polymer are obtained corresponding to an activity of 100 kg PP/(g metallocenexh).

Comparison Example 23

Preparation of Catalyst System 12

24.6 mg (0.032 mmol) of dimethylsilanediyl(2-isopropyl-4-(4'-tert-butylphenyl)-1-indenyl)(2-methyl-4-(4'-tert-butylphenyl)-1-indenyl)zirconium dichloride are dissolved in 10 ml toluene at room temperature. To this solution 1.5 ml of a methylaluminoxane solution (30% in toluene) are added. The solution is stirred for one hour at room temperature. This solution is added to a suspension of 1.5 g of $SiO_2$ (Grace XPO 2107, dried at 180° C. and 1 mbar for 16 h) in 10 ml of toluene. The corresponding suspension is stirred at room temperature for 15 minutes and the solvent is removed in vacuum. About 1.8 to 2.1 g of a free-flowing powder are obtained.

Comparison Example 24

Polymerisation with Catalyst System 12

A dry 1.8 $dm^3$ autoclave is purged with nitrogen and subsequently with propylene and charged with 1500 $cm^3$ of liquid propylene. 2 cm³ of triisobutylaluminum (20 wt.-% solution in heptane) are added and the mixture is stirred for 15 minutes at 30° C.

For the polymerizations 0.006 mmol of the respective metallocene compounds, supported according to Example 23 are used. The corresponding amount of the catalyst powder is suspended in 20 cm³ of heptane and is injected with 15 cm³ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 366 g of polymer are obtained corresponding to an activity of 79 kg PP/(g metallocene×h).

Example 25

Preparation of Catalyst System 13
a) Preparation of Tris(bis(pentafluorophenylboroxy))alane
1 mL of trimethylaluminium solution (2.1 M in Exxol) is introduced into 13 mL of toluene at room temperature, 2.17 g (6.0 mmoles) of bis(pentafluorophenyl)borinic acid are added. After the addition the suspension is heated at 60° C. for 90 minutes.
b) Preparation of Supported Tris(bis(pentafluorophenylboroxy))alane
1.5 g of SiO₂ (Grace XPO 2107, dried at 180° C. and 1 mbar for 16 h) are suspended in 15 mL of toluene. 225 µL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 3.2 g of the support material are obtained.
c) Preparation of Catalyst System 13
61.1 mg (0.128 mmole) of dimethylsilanediylbis(2-methylindenyl)zirconium dichloride are dissolved in 22 mL of toluene and 610 µL of a trimethylaluminium solution (2.1 M in toluene) are added dropwise at room temperature. The suspension is stirred for one hour at 50° C. This solution is added dropwise to a suspension of 3.0 g of the support material prepared in (b) in 15 mL of toluene. The suspension is stirred for one hour at room temperature, and the solvent is removed in a vacuum. About 3.1-3.3 g of a free-flowing powder are obtained.

Example 26

Polymerization Procedure A with Catalyst System 13
A dry 1.8 dm³ autoclave is purged with nitrogen and subsequently with propylene and charged with 1500 cm³ of liquid propylene. 2 cm³ of triisobutylaluminum (20 wt.-% solution in heptane) are added and the mixture is stirred for 15 minutes at 30° C.

For the polymerizations 0.004 mmol of the respective metallocene compounds, supported according to Example 25, are used. The corresponding amount of the catalyst powder is suspended in 20 cm³ of heptane and is injected with 15 cm³ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 157 g of polymer are obtained corresponding to an activity of 82 kg PP/(g metallocene×h).

Comparison Example 27

Preparation of Catalyst System 14
a) Preparation of Bis(pentafluorophenylboroxy)methylalane
1 mL of trimethylaluminium solution (2.1 M in Exxol) is introduced into 13 mL of toluene at room temperature, 1.45 g (4.0 mmoles) of bis(pentafluorophenyl)borinic acid are added. After the addition the suspension is heated at 60° C. for 90 minutes.
b) Preparation of Supported Bis(pentafluorophenylboroxy)methylalane
1.5 g of SiO₂ (Grace XPO 2107, dried at 180° C. and 1 mbar for 16 h) are suspended in 15 mL of toluene. 225 µL (1.5 mmoles) of N,N-dimethylbenzylamine are added, and the suspension is stirred slowly for one hour at room temperature. The solution prepared in (a) is added dropwise to this suspension at room temperature, and the resulting suspension is stirred for one hour at room temperature. The suspension is filtered through a G4 fritted glass filter, the residue is washed with 5 ml heptane and the residue is dried in a vacuum. 2.5 g of the support material are obtained.
c) Preparation of Catalyst System 14
48.9 mg (0.102 mmole) of dimethylsilanediylbis(2-methylindenyl)zirconium dichloride are dissolved are dissolved in 18 mL of toluene and 510 µL of a trimethylaluminium solution (2.1 M in toluene) are added dropwise at room temperature. The suspension is stirred for one hour at 50° C. This solution is added dropwise to a suspension of 2.3 g of the support material prepared in (b) in 12 mL of toluene. The suspension is stirred for one hour at room temperature, and the solvent is removed in a vacuum. About 2.3-2.5 g of a free-flowing powder are obtained.

Comparison Example 28

Polymerization Procedure A with Catalyst System 14
A dry 1.8 dm³ autoclave is purged with nitrogen and subsequently with propylene and charged with 1500 cm³ of liquid propylene. 2 cm³ of triisobutylaluminum (20 wt.-% solution in heptane) are added and the mixture is stirred for 15 minutes at 30° C.

For the polymerizations 0.006 mmol of the respective metallocene compounds, supported according to Comparison Example 27, are used. The corresponding amount of the catalyst powder is suspended in 20 cm³ of heptane and is injected with 15 cm³ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 97 g of polymer are obtained corresponding to an activity of 34 kg PP/(g metallocene×h).

Comparison Example 29

Preparation of Catalyst System 15
15.3 mg (0.032 mmol) of dimethylsilanediylbis(2-methylindenyl)zirconium dichloride are dissolved in 10 ml toluene at room temperature. To this solution 1.5 ml of a methylaluminoxane solution (30% in toluene) are added. The solution is stirred for one hour at room temperature. This solution is added to a suspension of 1.5 g of $SiO_2$ (Grace XPO 2107, dried at 180° C. and 1 mbar for 16 h) in 10 ml of toluene. The corresponding suspension is stirred at room temperature for 15 minutes and the solvent is removed in vacuum. About 1.8 to 2.1 g of a free-flowing powder are obtained.

Comparison Example 30

Polymerisation with Catalyst System 15

A dry 1.8 $dm^3$ autoclave is purged with nitrogen and subsequently with propylene and charged with 1500 $cm^3$ of liquid propylene. 2 $cm^3$ of triisobutylaluminum (20 wt.-% solution in heptane) are added and the mixture is stirred for 15 minutes at 30° C.

For the polymerizations 0.006 mmol of the respective metallocene compounds, supported according to comparison example 29 are used. The corresponding amount of the catalyst powder is suspended in 20 $cm^3$ of heptane and is injected with 15 $cm^3$ of heptane. The reaction mixture is heated to the polymerization temperature of 65° C. and polymerization is allowed to proceed at 65° C. for 60 minutes. The polymerization is stopped by releasing the liquid monomer and cooling down the reactor. The produced polymer is dried under reduced pressure at 80° C. and 80 g of polymer are obtained corresponding to an activity of 28 kg PP/(g metallocene×h).

The invention claimed is:

1. A process for the preparation of a catalyst system, comprising the steps of:
  a) combining a Lewis base, at least one organic compound having at least one functional group containing active hydrogen, and a first organometallic component containing at least one organometallic compound with a particulate support material, to provide an intermediate composition;
  b) combining the intermediate composition with one or more metallocene compound, wherein the stoichiometric ratio of the organic compound having active hydrogen to the first organometallic component containing at least one organometallic compound ranges from about 3:1 to 5:1.

2. A process for the preparation of a catalyst system, comprising the steps of:
  a) providing a Lewis base having the formula V:

$$M^2R^{11}R^{12}R^{13} \quad (V)$$

wherein
   $M^2$ is an element of group V of the Periodic Table of the Elements,
   $R^{11}$, $R^{12}$ and $R^{13}$ are identical or different and are each a hydrogen atom, a $C_1$-$C_{20}$-alkyl group, a $C_1$-$C_{20}$-haloalkyl group or a $C_7$-$C_{40}$-arylalkyl group, where two radicals or all three radicals $R^{11}$, $R^{12}$ and $R^{13}$ may be joined to one another via $C_2$-$C_{20}$ units, where at least one radical $R^{11}$, $R^{12}$ or $R^{13}$ is a $C_7$-$C_{40}$-arylalkyl group;
  b) providing an organic compound of formula VI having at least one functional group containing active hydrogen:

wherein
   G is an atom of Group III, IV or V of the Periodic Table of the Elements or a group comprising from 2 to 20 carbon atoms, or a partially halogenated or perhalogenated $C_1$-$C_{20}$-saturated aliphatic hydrocarbon or $C_6$-$C_{40}$-aromatic group,
   $R^{14}$ are identical or different and are each, independently of one another, hydrogen, halogen, $C_1$-$C_{20}$ alkyl, $C_1$-$C_{20}$ haloalkyl, $C_1$-$C_{10}$ alkoxy, $C_6$-$C_{20}$ aryl, $C_6$-$C_{20}$ haloaryl, $C_6$-$C_{20}$ aryloxy, $C_7$-$C_{40}$ arylalkyl, $C_7$-$C_{40}$ haloarylalkyl, $C_7$-$C_{40}$ alkylaryl or $C_7$-$C_{40}$ haloalkylaryl or $R^{14}$ is an $OSiR^{15}_3$ group, where
   $R^{15}$ are identical or different and are each hydrogen, halogen, $C_1$-$C_{20}$ alkyl, $C_1$-$C_{20}$ haloalkyl, $C_1$-$C_{10}$ alkoxy, $C_6$-$C_{20}$ aryl, $C_6$-$C_{20}$ haloaryl, $C_6$-$C_{20}$ aryloxy, $C_7$-$C_{40}$ arylalkyl, $C_7$-$C_{40}$ haloarylalkyl, $C_7$-$C_{40}$ alkylaryl or $C_7$-$C_{40}$ haloalkylaryl,
   r is at least 1, and
   s is an integer from 0 to 30;
  c) providing at least one organometallic compound having formula VII:

wherein
   $M^5$ is an alkali metal, an alkaline earth metal or a metal of group III of the Periodic Table of the Elements,
   $R^{22}$ is a hydrogen atom, alkyl of from 1 to about 10 carbon atoms, aryl of from 6 to about 15 carbon atoms, or alkylaryl or arylalkyl each having from 1 to 10 carbon atoms in the alkyl part and from 6 to 20 carbon atoms in the aryl part,
   $R^{23}$ and $R^{24}$ are each a hydrogen atom, a halogen atom, alkyl of from 1 to about 10 carbon atoms, aryl of from about 6 to about 15 carbon atoms, or alkylaryl, arylalkyl or alkoxy each having from 1 to 10 carbon atoms in the alkyl part and from 6 to 20 carbon atoms in the aryl radical,
   t is an integer from 1 to 3 and
   u and v are integers from 0 to 2, where the sum t+u+v corresponds to the valence of $M^5$;
  d) reacting a suspension of a particulate support material in a first solvent for about one minute to about 48 hours with the at least one Lewis base of formula V at a temperature of about −40° C. to about 110° C. to provide an activated support material;
  e) reacting in a first reaction mixture the at least one organic compound of formula VI with the at least one organometallic compound of formula VII in a second solvent at a temperature of from about −40° C. to about 110° C. for about one minute to about 48 hours to provide a reaction product, wherein the stoichiometric ratio of the compounds of formula VI and formula VII is from 3:1 to 5:1;
  f) reacting in a second reaction mixture the activated support of step (d) with the first reaction mixture of step (e), or with the reaction product isolated from the reaction mixture, at a temperature of from about −40° C. to about 110° C. for about one minute to about 48 hours in a second solvent to form a modified support material;
  g) reacting the second reaction mixture of step (f), or the modified support material isolated from the second reaction mixture, with at least one metallocene component in a third solvent at a temperature of from about −40° C. to about 110° C. for from about one minute to about 48 hours to provide a catalyst system, where the ratio of the modified support material to the metallocene component is from about 10 g:1 µmol to about $10^{-2}$ g:1 µmol; and h) separating the catalyst system.

3. The process of claim 2 wherein the catalyst system is prepolymerized with one or more olefinic monomer(s), to obtain a prepolymerized catalyst system.

4. The process of claim 2 wherein the at least one metallocene component is reacted with at least one organometallic compound having formula VII at a stoichiometric ratio from about 100:1 to about $10^{-4}$:1 in a suitable solvent at a temperature of from about −40° C. to about 110° C. for about one minute to about 48 hours.

5. The process of claim 2 wherein the Lewis base is a compound selected from the group consisting of N,N-diethylbenzylamine, N,N -dimethylbenzylamine, N-benzyldimethylamine, N-benzyldiethylamine, N -benzylbutylamine, N-benzyl tertbutylamine, N-benzylisopropylamine, N -benzylmethylamine, N-benzylethylamine, N-benzyl-1-phenylethylamine, N -benzyl-2-phenylethylamine, N,N-dimethylbenzylamine, N,N-diethylbenzylamine, N-methyl-N-ethylbenzylamine, N-methyldibenzylamine and N-ethyldi(benzyl)amine.

6. The process of claim 2 wherein step (d) comprises reacting the suspension of support material in an aromatic or aliphatic solvent for 10 minutes to 2 hours with the Lewis base of formula V at a temperature of from about −10° C. to about 80° C., step (e) comprises reacting the organic compound of formula VI with the organometallic compound of formula VII in an aromatic or aliphatic solvent at a temperature of from about −10° C. to 80° C. for 10 minutes to 3 hours, where the stoichiometric ratio of the compounds of formula VI and formula VII is from about 3:1 to about 4:1, step (f) comprises reacting the activated support with the first reaction mixture or with the isolated reaction product produced in (e) at a temperature of from about −10° C. to about 80° C. for about 10 minutes to about 2 hours in an aliphatic or aromatic solvent to form the modified support material, step (g) comprises reacting the second reaction mixture or the isolated modified support material produced in step (f) with the at least one metallocene component in an aromatic or aliphatic solvent at a temperature of from about −10° C. to about 80° C. for 10 minutes to 2 hours, where the ratio of the modified support material to the metallocene component is from about 10 g:1 µmol to about $10^{-2}$ g:1 µmol, and step (h) comprises washing the resulting catalyst system with an aromatic or aliphatic solvent, and drying the resulting supported catalyst at temperatures of 30 to 60° C.

7. The process of claim 4 wherein the at least one metallocene component is reacted with the organometallic compound of formula VII at a stoichiometric ratio from 1:1 to $10^{-2}$:1 in an aromatic or aliphatic solvent at a temperature of −10° C. to 80° C. for 10 minutes to 2 hours.

8. The process of claim 2 wherein step (d) comprises reacting a suspension of a silica support material in toluene for 10 minutes to 2 hours with a N,N-dialkylbenzylamine at about 10° C. to about 30° C., step (e) comprises reacting a boron compound of formula VI $(R^{14})_2$—B—(OH) having one functional group containing active hydrogen with a solution of a trialkyl aluminum compound of formula VII Al$(R_{22})_t(R^{23})_u$ $(R^{24})_v$ in toluene at a temperature of about 10° C. to about 80° C. for about 10 minutes to about 3 hours, where the stoichiometric ratio of the compounds of formula VI and formula VII is about 3:1 step (f) comprises reacting the activated support produced in (d) with the first reaction mixture or with the isolated reaction product thereof at about 10° C. to about 30° C. for about 10 minutes to about 2 hours in toluene to form the modified support material, step (g) comprises reacting the second reaction mixture or the isolated modified support material produced in step (f) with the metallocene in toluene at about 10° C. to about 30° C. for about 10 minutes to about 2 hours, where the ratio of the modified support material to the metallocene component is from about 10 g:1 µmol to about $10^{-2}$ g:1 µmol, and step (h) comprises washing the resulting catalyst with an aromatic or aliphatic solvent, drying the resulting supported catalyst at temperatures of 30 to 60° C. to obtain a prepolymerized catalyst system.

9. The process of claim 8 wherein the catalyst system is prepolymerized with one or more olefinic monomer(s) to obtain a prepolymerized catalyst system.

10. The process of claim 2 wherein at least one of $R^{11}$, $R^{12}$ and $R^{13}$ is a benzylic group.

11. The process of claim 1 wherein the organic compound having at least one functional group containing active hydrogen contains at least one functional group selected from hydroxyl, mercapto, primary amino, secondary amino, silanol, carboxyl, amido and imino groups.

12. The process of claim 2 wherein r is from 1 or 2 and, and s is an integer of 2 when r is 1, or 1 when r is 2.

13. The process of claim 1 wherein the organic compound having at least one functional group containing active hydrogen comprises a compound of formula $(R^{14})_2$—B—(OH) where $R^{14}$ are identical and are each selected from the group consisting of $C_6$-$C_{20}$ haloaryl, $C_6$-$C_{20}$ aryloxy, $C_7$-$C_{40}$ arylalkyl, $C_7$-$C_{40}$ haloarylalkyl, $C_7$-$C_{40}$ alkylaryl and $C_7$-$C_{40}$ haloalkylaryl.

14. The process of claim 1 wherein the organic compound having at least one functional group containing active hydrogen comprises a compound of formula $(R^{14})_2$—B—(OH) where $R^{14}$ identical and are each selected from the group consisting of $C_8$-$C_{20}$ haloaryl, $C_7$-$C_{40}$ haloarylalkyl and $C_7$-$C_{40}$ haloalkylaryl.

15. The process of claim 1 wherein the organic compound having at least one functional group containing active hydrogen is selected from the group consisting of bis(pentafluorophenyl)borinic acid and pentafluorophenylboronic acid.

16. The process of claim 1 wherein the organic compound containing at least one functional group containing active hydrogen is bis(pentafluorophenyl)borinic acid.

17. The process of claim 2 wherein $M^5$ is lithium, magnesium or aluminum and $R^{23}$ and $R^{24}$ are each alkyl of from 1 to about 10 carbon atoms.

18. The process of claim 17 wherein the $M^5$ is aluminum.

19. The process of claim 1 wherein the particulate support material is thermally pretreated by heating in an inert gas atmosphere to a temperature of from about 80° C. to about 1000° C.

20. The process of claim 2 wherein the particulate support material is thermally pretreated by heating in an inert gas atmosphere to a temperature of from about 150° C. to about 200° C.

21. The process of claim 2 wherein the particulate support material is silica gel, thermally pretreated by heating in an inert gas atmosphere to a temperature of from about 150° C. to about 200° C.

22. The process of claim 2 wherein the particulate support material is chemically pretreated with a passivating agent to remove water and/or surface hydroxyl groups.

23. The process of claim 1 wherein the metallocene compound has the formula (1):

$$(R^9)_n(L^1)_m M^1(R^1)_q \quad (1)$$

where n is 0 or 1, m is 1, 2 or 3 q is 1, 2 or 3 and the sum of m and q equals the oxidation state of $M^1$ $L^1$ are identical or different and are each a substituted or unsubstituted mononuclear or polynuclear hydrocarbon radical or (a) hetero atom(s) containing hydrocarbon radical(s) that coordinates to $M^1$, $R^1$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and two or three $R^1$ can form one or more ring system(s), $M^1$ is a metal of group IVb of the Periodic Table of the Elements, $R^9$ is a bridging group linking two ligands $L^1$ selected from

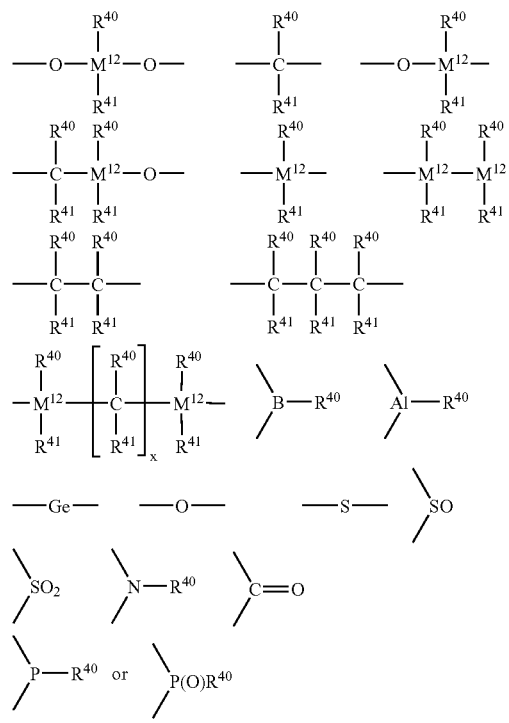

where $R^{40}$ and $R^{41}$, even when bearing the same index, can be identical or different and are each a hydrogen atom, a $C_1$-$C_{40}$ group selected from an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group and an arylalkenyl group of from 8 to about 40 carbon atoms, wherein $R^{40}$ and $R^{41}$ together with the atoms connecting them can form one or more cyclic systems or $R^{40}$ and/or $R^{41}$ can contain additional hetero atoms selected from Si, B, Al, O, S, N, P, Cl and Br, x is an integer from 1 to 18, $M^{12}$ is silicon, germanium or tin, and $R^9$ link two units of the formula 1 to one another, or $R^9$ forms a $R^9$-$Z^1$ group, with $R^9$ being linked to one $L^1$ group and $Z^1$ being linked to $M^1$, where $Z^1$ comprises nitrogen, phosphorus, oxygen or sulfur such as —O—, —S—, —$NR^{42}$ or $PR^{42}$—, where $R^{42}$ is a hydrogen atom, a $C_1$-$C_{40}$ group such as an alkyl group having from 1 to about 30 carbon atoms, a cycloalkyl group of from 3 to 10 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group,or an arylalkenyl group of from 8 to about 40 carbon atoms.

24. The process of claim 23 wherein the $L^1$ hydrocarbon radicals are selected from the group consisting of substituted or unsubstituted cyclopentadienyl, indenyl, tetrahydroindenyl, azurenyl, fluorenyl, azapentalenyl, thiapentalenyl and oxapentalenyl.

25. The process of claim 1 wherein the metallocene compound has the formula 1a:

$$R^9L^1L^2M^1R^1R^2 \quad (1a)$$

where $L^1$ and $L^2$ are identical or different and are each a substituted mononuclear or polynuclear hydrocarbon radical or (a) hetero atom(s) containing hydrocarbon radical(s) which can form a sandwich structure with the central atom $M^1$, $R^1$ and $R^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from about 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and $R^1$ and $R^2$ can form one or more ring system(s), $M^1$ is a metal of group IVb of the Periodic Table of the Elements, $R^9$ is a bridge between the ligands $L^1$ and $L^2$, selected from

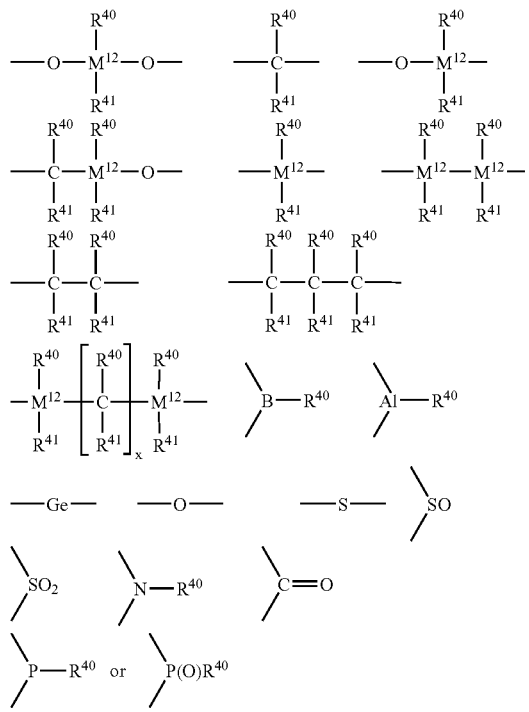

where
R$^{40}$ and R$^{41}$, even when bearing the same index, can be identical or different and are each a hydrogen atom, a C$_1$-C$_{40}$ group such as an alkyl group having from 1 to about 30 carbon atoms, an aryl group of from 6 to about 40 carbon atoms, a fluoroalkyl group of from 1 to about 10 carbon atoms, an alkoxy group of from 1 to about 10 carbon atoms, an aryloxy group of from 6 to about 10 carbon atoms, an alkenyl group of from 2 to about 10 carbon atoms, an arylalkyl group of from 7 to about 40 carbon atoms, an alkylaryl group of from 7 to about 40 carbon atoms, a substituted or unsubstituted alkylsilyl, alkyl(aryl)silyl or arylsilyl group,or an arylalkenyl group of from 8 to about 40 carbon atoms, R$^{40}$ and R$^{41}$ together with the atoms connecting them can form one or more cyclic systems or R$^{40}$ and/or R$^{41}$ can contain additional hetero atoms selected from the group consisting of Si, B, Al, O, S, N, P, Cl and Br, x is an integer from 1 to 18, M$^{12}$ is silicon, germanium or tin, and R$^9$ may also link two units of the formula (1a) to one another.

26. The process of claim 25 wherein:
M$^1$ is zirconium or hafnium,
L1 and L2 are identical or different and are each a substituted cyclopentadienyl, indenyl, tetrahydroindenyl, azurenyl, fluorenyl, azapentalenyl, thiapentalenyl or oxapentalenyl, which can form a sandwich structure with the central atom M$^1$,
R$^9$ is R$^{40}$R$^{41}$Si=, R$^{40}$R$^{41}$Ge=, R$^{40}$R$^{41}$C= or —(R$^{40}$R$^{41}$C—CR$^{40}$R$^{41}$)—, where R$^{40}$ and R$^{41}$ are identical or different and are each a hydrogen atom, a hydrocarbon group of from 1 to about 30 carbon atoms, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl or an arylsilyl group.

27. The process of claim 25 wherein M$^1$ is zirconium and L$^1$ and L$^2$ are identical or different and are each a substituted indenyl, azurenyl, fluorenyl, azapentalenyl, thiapentalenyl or oxapentalenyl, which can form a sandwich structure with the central atom M$^1$, and the bridging unit R$^9$ is R$^{40}$R$^{41}$Si= or R$^{40}$R$^{41}$Ge=, where R$^{40}$ and R$^{41}$ are identical or different and are methyl, ethyl, propyl, butyl, pentyl, hexyl, heptyl, octyl, nonyl, decyl, undecyl, dodecyl, cyclo-pentyl, cyclopentadienyl, cyclohexyl, phenyl, benzyl, trimethylsilyl or 3,3,3-trifluoropropyl.

28. The process of claim 25 wherein the metallocene compound has formula 1b below:

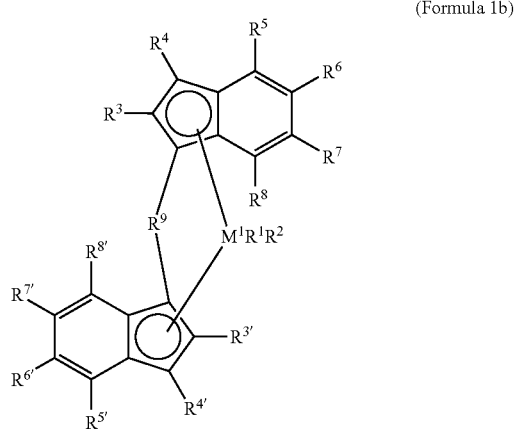

(Formula 1b)

wherein
M$^1$ is a metal of group IVb of the Periodic Table of the Elements,
R$^1$ and R$^2$ are identical or different and are each a hydrogen atom, an alkyl group of from 1 to about 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a NR$_2^{32}$ group, where R$^{32}$ is an alkyl group of from 1 to about 10 carbon atoms or an aryl group of from 6 to about 14 carbon atoms and R$^1$ and R$^2$ may form one or more ring system(s),
R$^3$, R$^4$, R$^5$, R$^6$, R$^7$, R$^8$ and also R$^{3'}$, R$^{4'}$, R$^{5'}$, R$^{6'}$, R$^{7'}$ and R$^{8'}$ are identical or different and are each a hydrogen atom, a linear, cyclic or branched hydrocarbon group, with the proviso that R$^3$ and R$^{3'}$ are not both hydrogen, wherein said groups may contain one or more hetero atoms selected from the groups consisting of Si, B, Al, O, S, N, P, F, Cl and Br, and two adjacent radicals R$^5$, R$^6$ or R$^{5'}$, R$^{6'}$, or R$^6$, R$^7$ or R$^{6'}$, R$^{7'}$, or R$^7$, R$^8$ or R$^{7'}$, R$^{8'}$ in each case may form a hydrocarbon ring system and the bridging unit R$^9$ has the meaning set forth above with respect to formula (1a).

29. The process of claim 28 wherein:
M$^1$ is zirconium or hafnium,
R$^1$ and R$^2$ are identical or different and are an alkyl group of from 1 to about 10 carbon atoms, an alkoxy group of from 1 to about 10 carbon atoms, an aryloxy group of from 6 to about 10 carbon atoms or a halogen atom, or R$^1$ and R$^2$ together may form one or more ring system(s), $R^3$ and $R^{3'}$, are identical or different and are each a linear, cyclic or branched hydrocarbon group which may be halogenated, $R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom, a substituted or unsubstituted alkylsilyl or arylsilyl group, a linear, cyclic or branched alkyl group of from 1 to about 10 carbon atoms, or an aryl group of from 6 to about 10 carbon atoms, which may contain one or more hetero atoms selected form the group consisting of Si, B, Al, O, S, N, P, F, Cl and Br, and the two adjacent radicals $R^5$, $R^6$ and $R^{5'}$, $R^{6'}$ can form a hydrocarbon ring system, $R^9$ is $R^{40}R^{41}Si=$, $R^{40}R^{41}Ge=$, $R^{40}R^{41}C=$ or $—(R^{40}R^{41}C—CR^{40}R^{41})—$, where $R^{40}$ and $R^{41}$ are identical or different and are each a hydrogen atom, an alkyl group of from 1 to 10 carbon atoms, an aryl group of from 6 to about 40 carbon atoms, an arylalkyl group of from 7 to about 14 carbon atoms or an alkylaryl group of from 7 to about 14 carbon atoms or a substituted or unsubstituted alkylsilyl group, an alkyl(aryl)silyl or an arylsilyl group.

30. The process of claim 28 wherein:
$M^1$ is zirconium,
$R^1$ and $R^2$ are identical or different and are methyl, chlorine or phenolate,
$R^3$ and $R^{3'}$, are identical or different and are each a linear, cyclic or branched hydrocarbon group which may be halogenated,
$R^4$ also $R^{4'}$ are hydrogen,
$R^5$, $R^6$, $R^7$, $R^8$ and also $R^{5'}$, $R^{6'}$, $R^{7'}$, $R^{8'}$ are identical or different and are each a hydrogen atom or a linear, cyclic or branched alkyl group of from 1 to about 10 carbon atoms, or an aryl group of from 6 to about 10 carbon atoms and/or the two adjacent radicals $R^5$, $R^6$ and $R^{5'}$, $R^{6'}$ respectively together may form a ring system,
$R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadienyl, cyclohexyl, phenyl, benzyl, trimethylsilyl or 3,3,3-trifluoropropyl.

31. The process of claim 25 wherein the metallocene compound has formula 1c:

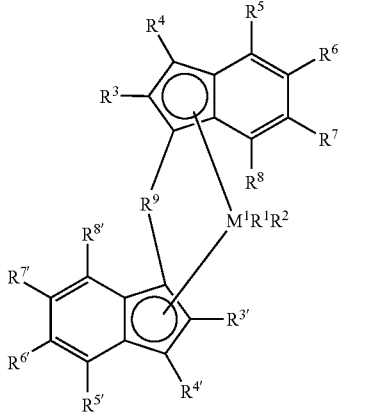

(Formula 1c)

where the substituents and indices have the following meanings:
$M^1$ is a metal of group IVb of the Periodic Table of the Elements, $R^1$ and $R^2$ are identical or different and are each a hydrogen atom, an alkyl group of from 1 to 10 carbon atoms, an alkoxy group of from 1 to about 10 carbon atoms, an aryl group of from 6 to about 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms or an aryl group of from 6 to about 14 carbon atoms, and $R^1$ and $R^2$ may form one or more ring system(s), $R^3$, $R^4$, $R^5$, $R^6$, $R^7$, $R^8$ and also $R^{3'}$, $R^{4'}$, $R^{5'}$, $R^{6'}$, $R^{7'}$ and $R^{8'}$ are identical or different and are each a hydrogen atom, a linear, cyclic or branched hydrocarbon group, with the proviso that $R^3$ and $R^{3'}$ are not both hydrogen and that $R^5$ and $R^{5'}$ are identical or different and are each a substituted or unsubstituted aryl group of from 6 to about 40 carbon atoms, the hydrocarbon groups may contain one or more hetero atoms selected from the group consisting of Si, B, Al, O, S, N, P, F, Cl and Br, and
the bridging unit $R^9$ has the meaning set forth above with respect to formula 1a.

32. The process of claim 31 wherein:
$M^1$ is zirconium or hafnium,
$R^1$ and $R^2$ are identical or different and are an alkyl group of from 1 to about 10 carbon atoms, an alkoxy group of from 1 to about 10 carbon atoms, an aryloxy group of from 6 to about 10 carbon atoms, or a halogen atom, and $R^1$ and $R^2$ may form one or more ring system(s),
$R^3$ and $R^{3'}$, are identical or different and are each a linear, cyclic or branched group which may be halogenated,
$R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br,
$R^5$ and $R^{5'}$ are identical or different and are each a substituted or unsubstituted aryl group of from 6 to about 40 carbon atoms,
$R^9$ is $R^{40}R^{41}Si=$, $R^{40}R^{41}Ge=$, $R^{40}R^{41}C=$ or $—(R^{40}R^{41}C—CR^{40}R^{41})—$, where $R^{40}$ and $R^{41}$ are identical or different and are each a hydrogen atom, a $C_1$-$C_{30}$-hydrocarbon group, in particular an alkyl group of from 1 to about 10 carbon atoms, an aryl group of from 6 to about 40 carbon atoms, an arylalkyl group of from 7 to about 14 carbon atoms, an alkylaryl group of from 7 to about 14 carbon atoms or a substituted or unsubstituted alkylsilyl group, an alkyl(aryl)silyl or an arylsilyl group.

33. The process of claim 22 wherein:
$M^1$ is zirconium,
$R^1$ and $R^2$ are identical and are methyl, chlorine, or phenolate,
$R^3$ and $R^{3'}$ are identical or different and are each a linear, cyclic or branched methyl, ethyl, propyl, butyl, pentyl or hexyl,
$R^4$ also $R^{4'}$ are hydrogen,
$R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br, $R^5$ and $R^{5'}$ are identical or different and are phenyl, naphthyl, para-($C_1$-$C_{10}$-alkyl)phenyl, para-($C_1$-$C_{10}$-fluoroalkyl)phenyl, meta-($C_1$-$C_{10}$-alkyl)phenyl, meta-($C_1$-$C_{10}$-alkyl)phenyl, meta, meta'-($C_1$-$C_{10}$-alkyl)$_2$phenyl or meta, meta'-($C_1$-$C_{10}$-fluoroalkyl)$_2$phenyl, $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclopentyl, cyclopentadlenyl, cyclohexyl, phenyl, benzyl, trimethylsilyl or 3,3,3-trifluoropropyl.

34. The process of claim 16 wherein the metallocene compound has the formula 1d:

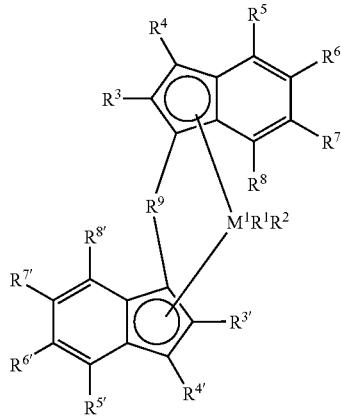

(Formula 1d)

wherein:

$M^1$ is a metal of group IVb of the Periodic Table of the Elements, $R^1$ and $R^2$ are identical or different and are each a hydrogen atom, an alkyl group of from 1 to about 10 carbon atoms, an alkoxy group of from 1 to about 10 carbon atoms, an aryl group of from 6 to 20 carbon atoms, an aryloxy group of from 6 to about 10 carbon atoms, an alkenyl group of from 2 to about 10 carbon atoms, an OH group, a halogen atom, or a $NR_2^{32}$ group, where $R^{32}$ is an alkyl group of from 1 to about 10 carbon atoms, or an aryl group of from 6 to about 14 carbon atoms, or $R^1$ and $R^2$ may form one or more ring system(s), $R^4$, $R^5$, $R^6$, $R^7$, $R^8$ and also $R^{4'}$, $R^{5'}$, $R^{6'}$, $R^{7'}$ and $R^{8'}$ are identical or different and are each a hydrogen atom, a linear, cyclic or branched hydrocarbon group, or a substituted or unsubstituted alkylsilyl or arylsilyl group, with the proviso that $R^5$ and $R^{5'}$ are identical or different and are each a substituted or unsubstituted aryl group of from 6 to about 40 carbon atoms, the hydrocarbon groups can contain one or more hetero atoms selected from the group consisting of Si, B, Al, O, S, N, P, F, Cl and Br, $R^3$ is a hydrocarbon group, not cyclic or branched in the α-position, wherein the hydrocarbon groups can contain one or more hetero atoms selected from the group consisting of Si, B, Al, O, S, N, P, F, Cl and Br, $R^{3'}$ is a in α-position or in β-position cyclic or branched hydrocarbon group, wherein the hydrocarbon groups may contain one or more hetero atoms selected from the group consisting of Si, B, Al, O, S, N, P, F, Cl and Br, and the bridging unit $R^9$ has the meaning mentioned above with respect to formula 1a.

35. The process of claim 25 wherein:

$M^1$ is zirconium or hafnium, $R^1$ and $R^2$ are identical or different and are an alkyl group of from 1 to about 10 carbon atoms, an alkoxy group of from 1 to about 10 carbon atoms, an aryloxy group of from 6 to about 10 carbon atoms or a halogen atom, and $R^1$ and $R^2$ may form one or more ring system(s), $R^3$ is a linear alkyl group of from 1 to about 10 carbon atoms or an alkenyl group of from 2 to 10 carbon atoms, which can be halogenated, $R^{3'}$ is a in α-position or in β-position cyclic or branched alkyl group of from 3 to about 20 carbon atoms, an alkenyl group of from 3 to about 20 carbon atoms, an alkylaryl group of from 7 to about 20 carbon atoms, or a trimethylsilyl group, $R^4$, $R^6$, $R^7$, $R^8$ and also $R^{4'}$, $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br, $R^5$ and $R^{5'}$ are identical or different and are each a substituted or unsubstituted aryl group of from 6 to about 40 carbon atoms, $R^9$ is $R^{40}R^{41}Si=$, $R^{40}R^{41}Ge=$, $R^{40}R^{41}C=$ or —($R^{40}R^{41}C$—$CR^{40}R^{41}$)—, where $R^{40}$ and $R^{41}$ are identical or different and are each a hydrogen atom, an alkyl group of from 1 to about 10 carbon atoms, an aryl group of from 6 to about 40 carbon atoms, an arylalkyl group of from 7 to 14 carbon atoms, an alkylaryl group of from 7 to 14 carbon atoms or a substituted or unsubstituted alkylsilyl group, an alkyl(aryl)silyl or an arylsilyl group.

36. The process of claim 25 wherein:

$M^1$ is zirconium, $R^1$ and $R^2$ are identical and are methyl, chlorine, or phenolate, $R^3$ is methyl, ethyl, n-propyl, n-butyl, n-pentyl or n-hexyl, $R^{3'}$ is iso-propyl, iso-butyl, n-butyl, sec-butyl, cyclobutyl, 1-methyl-butyl, 1-ethyl-butyl, 1-methyl-pentyl, cyclopentyl, cyclohexyl, cyclopent-2-enyl, cyclopent-3-enyl, cyclohex-2-enyl, cyclohex-3-enyl, para-methylcyclohexyl or trimethylsilyl, $R^4$ and also $R^{4'}$ are hydrogen, and $R^6$, $R^7$, $R^8$ and also $R^{6'}$, $R^{7'}$ and $R^{8'}$ are identical or different and are each a hydrogen atom or a linear, cyclic or branched alkyl group of from 1 to about 10 carbon atoms, which may contain one or more hetero atoms selected from the group consisting of Si, B, Al, O, S, N, P, F, Cl and Br, $R^5$ and $R^{5'}$ are identical or different and are phenyl, p-isopropyl-phenyl, p-tert.-butyl-phenyl, p-s-butyl-phenyl, p-cyclohexyl, p-trimethylsilyl-phenyl, p-adamantyl-phenyl, p-(trisfluor)trimethyl-phenyl or m,m'-dimethyl-phenyl, $R^9$ is $R^{40}R^{41}Si=$ or $R^{40}R^{41}Ge=$, where $R^{40}$ and $R^{41}$ are identical or different and are methyl, ethyl, propyl, butyl, pentyl, hexyl, heptyl, octyl, nonyl, decyl, undecyl, dodecyl, cyclo-pentyl, cyclo-pentadienyl, cyclohexyl, phenyl, benzyl, trimethylsilyl or 3,3,3-trifluoropropyl.

37. A catalyst system prepared in accordance with the process of claim 1.

38. A catalyst system prepared in accordance with the process of claim 2.

39. The process of claim 28 wherein $R^3$, $R^4$, $R^5$, $R^6$, $R^7$, $R^8$ and also $R^{3'}$, $R^{4'}$, $R^{5'}$, $R^{6'}$, $R^{7'}$ and $R^{8'}$ are identical or different and are each an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, a substituted or unsubstituted alkylsilyl group, an alkyl(aryl)silyl group or an arylsilyl group.

40. The process of claim 29 wherein $R^3$ and $R^{3'}$, are identical or different and are each an alkyl group of from 1 to 10 carbon atoms or an alkenyl group of from 2 to about 10 carbon atoms.

41. The process of claim 30 wherein $R^3$ and $R^{3'}$, are identical or different and are each an alkyl group of from 1 to 10 carbon atoms or an alkenyl group of from 2 to about 10 carbon atoms.

42. The process of claim 31 wherein $R^3$, $R^4$, $R^5$, $R^6$, $R^7$, $R^8$ and also $R^{3'}$, $R^{4'}$, $R^{5'}$, $R^{6'}$, $R^{7'}$ and $R^{8'}$ are identical or different and are each an alkyl group of from 1 to 10 carbon atoms, an alkenyl group of from 2 to about 10 carbon atoms, an arenyl group of from 6 to about 20 carbon atoms, an arylalkyl group of from 7 to about 40 carbon atoms, an alkylaryl group of from 7 to about 40 carbon atoms, an arylalkenyl group of from 8 to about 40 carbon atoms, or a substituted or unsubstituted alkylsilyl or arylsilyl group.

43. The process of claim 32 wherein $R^3$ and $R^{3'}$, are identical or different and are each an alkyl group of from 1 to 10 carbon atoms or an alkenyl group of from 2 to about 10 carbon atoms.

44. The process of claim 34 wherein $R^4$, $R^5$, $R^6$, $R^7$, $R^8$ and also $R^{4'}$, $R^{5'}$, $R^{6'}$, $R^{7'}$ and $R^{8'}$ are identical or different and are each an alkyl group of from 1 to about 10 carbon atoms, an alkenyl group of from 2 to about 10 carbon atoms, an aryl group of from 6 to about 20 carbon atoms, an arylalkyl group of from 7 to about 40 carbon atoms, an alkylaryl group of from 7 to about 40 carbon atoms, or an arylalkenyl group of from 8 to about 40 carbon atoms, $R^3$ is an alkyl group of from 1 to 20 carbon atoms, an aryl substituted alkyl group of from 7 to about 40 carbon atoms, or an aryl substituted alkenyl group of from 8 to about 40 carbon atoms, and $R^{3'}$ is an alkyl group of from 3 to about 20 carbon atoms, an alkenyl group of from 3 to about 20 carbon atoms, an aryl group of from 6 to about 20 carbon atoms, an arylalkyl group of from 7 to about 40 carbon atoms, an alkylaryl group of from 7 to about 40 carbon atoms or an arylalkenyl group of from 8 to about 40 carbon atoms.

45. The process of claim 35 wherein $R^5$ and $R^{5'}$ are identical or different and are each phenyl, naphthyl, para-($C_1$-$C_{10}$-alkyl)phenyl, meta-($C_1$-$C_{10}$-alkyl)phenyl, or meta, meta'-($C_1$-$C_{10}$-alkyl)$_2$phenyl.

* * * * *